US012083690B2

(12) United States Patent
Munich et al.

(10) Patent No.: US 12,083,690 B2
(45) Date of Patent: Sep. 10, 2024

(54) SYSTEMS AND METHODS FOR AUTHORING AND MODIFYING PRESENTATION CONVERSATION FILES FOR MULTIMODAL INTERACTIVE COMPUTING DEVICES/ARTIFICIAL COMPANIONS

(71) Applicant: Embodied, Inc., Pasadena, CA (US)

(72) Inventors: Mario E Munich, La Canada, CA (US); Stefan Scherer, Santa Monica, CA (US); Paolo Pirjanian, Glendale, CA (US); Craig Allen, Seattle, WA (US)

(73) Assignee: Embodied, Inc., Pasadena, CA (US)

( * ) Notice: Subject to any disclaimer, the term of this patent is extended or adjusted under 35 U.S.C. 154(b) by 248 days.

(21) Appl. No.: 17/621,224

(22) PCT Filed: Feb. 27, 2021

(86) PCT No.: PCT/US2021/020128
§ 371 (c)(1),
(2) Date: Dec. 20, 2021

(87) PCT Pub. No.: WO2021/174147
PCT Pub. Date: Sep. 2, 2021

(65) Prior Publication Data
US 2022/0176565 A1 Jun. 9, 2022

Related U.S. Application Data

(60) Provisional application No. 62/983,593, filed on Feb. 29, 2020, provisional application No. 63/154,664, filed on Feb. 26, 2021.

(51) Int. Cl.
*B25J 9/16* (2006.01)
*G06F 40/30* (2020.01)
(Continued)

(52) U.S. Cl.
CPC ............ *B25J 9/1697* (2013.01); *G06F 40/30* (2020.01); *G06V 40/174* (2022.01); *G10L 15/22* (2013.01)

(58) Field of Classification Search
CPC .... B25J 9/1697; B25J 11/001; B25J 11/0015; G06F 40/30; G06V 40/174; G10L 15/22
See application file for complete search history.

(56) References Cited

U.S. PATENT DOCUMENTS

2002/0165642 A1  7/2002  Sakaue et al.
2007/0128979 A1  6/2007  Shackelford et al.
(Continued)

FOREIGN PATENT DOCUMENTS

CN         111563140       8/2020
WO     WO/2019/144542     8/2019

OTHER PUBLICATIONS

International Search Report and Written Opinion of the International Searching Authority, Mailed May 2, 2022, PCT/US22/14213, 21 pages.

(Continued)

*Primary Examiner* — Jaime Figueroa
*Assistant Examiner* — Mohamad O El Sayah

(57) ABSTRACT

Systems and methods for authoring and modifying presentation conversation files are disclosed. Exemplary implementations may: receive, at a renderer module, voice files, visual effect files, facial expression files, and/or mobility files; analyze, by the language processor module, the voice files, the visual effect files, the facial expression files, and/or mobility files follow guidelines of a multimodal authoring system; generate, by the renderer module, one or more presentation conversation files based at least in part on the received voice files, visual effect files, facial expression files, and/or mobility files; test, at an automatic testing system, the one or more presentation conversation files to verify correct (Continued)

operation of a computing device that receives the one or more presentation conversation files as an input; and identify, by a multimodal review module, changes to be made to the voice input files, the visual effect files, the facial expression files, and/or the mobility files.

19 Claims, 8 Drawing Sheets

(51) Int. Cl.
  *G06V 40/16* (2022.01)
  *G10L 15/22* (2006.01)

(56) References Cited

U.S. PATENT DOCUMENTS

| | | |
|---|---|---|
| 2009/0055019 A1 | 2/2009 | Stiehl et al. |
| 2010/0076750 A1 | 3/2010 | Cosatto et al. |
| 2015/0148953 A1 | 5/2015 | Laurent et al. |
| 2015/0148957 A1* | 5/2015 | Kuffner, Jr. ............ B25J 9/1692 700/254 |
| 2015/0339589 A1 | 11/2015 | Fisher |
| 2016/0199977 A1 | 7/2016 | Breazeal |
| 2017/0125008 A1 | 5/2017 | Maisonnier et al. |
| 2017/0358305 A1 | 12/2017 | Kudurshian et al. |
| 2018/0068226 A1 | 3/2018 | O'Connor et al. |
| 2018/0133900 A1 | 5/2018 | Breazeal et al. |
| 2018/0229372 A1 | 8/2018 | Breazeal et al. |
| 2018/0260680 A1 | 9/2018 | Finkelstein et al. |
| 2018/0277117 A1 | 9/2018 | Hergenroeder |
| 2018/0301151 A1 | 10/2018 | Mont-Reynaud et al. |
| 2019/0042988 A1 | 2/2019 | Brown et al. |
| 2019/0248019 A1 | 8/2019 | Nelson |
| 2019/0279639 A1 | 9/2019 | Ginsberg et al. |
| 2019/0366538 A1 | 12/2019 | Laurent et al. |
| 2020/0050173 A1 | 2/2020 | Scherer et al. |
| 2020/0073938 A1* | 3/2020 | Losalka ................ G06F 40/295 |
| 2020/0218781 A1 | 7/2020 | Takano et al. |
| 2020/0320975 A1* | 10/2020 | Spata ...................... G10L 15/22 |
| 2021/0149921 A1* | 5/2021 | Alexander ............. G06N 3/006 |

OTHER PUBLICATIONS

International Search Report and Written Opinion of the International Searching Authority, Mailed Jun. 9, 2021, PCT/US21/20128, 10 pages.

International Search Report and Written Opinion of the International Searching Authority, Mailed Jun. 30, 2021, PCT/US21/20035, 12 pages.

International Search Report and Written Opinion of the International Searching Authority, Mailed May 20, 2021, PCT/US21/20124, 11 pages (2nd).

International Search Report and Written Opinion of the International Searching Authority, Mailed May 18, 2021, PCT/US21/20056, 21 pages (3rd).

International Search Report and Written Opinion of the International Searching Authority, Mailed Aug. 9, 2021, PCT/US21/29297, 15 pages.

International Search Report and Written Opinion of the International Searching Authority, Mailed May 18, 2021, PCT/US21/20148, 12 pages.

* cited by examiner

SYSTEMS AND METHODS FOR AUTHORING AND MODIFYING PRESENTATION CONVERSATION FILES FOR MULTIMODAL INTERACTIVE COMPUTING DEVICES/ARTIFICIAL COMPANIONS

RELATED APPLICATIONS

This application is a national stage filing and claims priority to PCT Application No. PCT/US21/20128, filed Feb. 27, 2021 and entitled SYSTEMS AND METHODS FOR AUTHORING AND MODIFYING PRESENTATION CONVERSATION FILES FOR MULTIMODAL INTERACTIVE COMPUTING DEVICES/ARTIFICIAL COMPANIONS," which claims priority to U.S. provisional patent application Ser. No. 62/983,593, filed Feb. 29, 2020, entitled "Systems and Methods for Authoring and Modifying Presentation conversation Files For Multimodal Interactive Computing Devices/Artificial companions," and to U.S. provisional patent application Ser. No. 63/154,664, filed Feb. 26, 2021, entitled "Systems and Methods for Authoring and Modifying Presentation conversation Files For Multimodal Interactive Computing Devices/Artificial Companions," the disclosure of which are hereby incorporated by reference in their entirety.

FIELD OF THE DISCLOSURE

The present disclosure relates to systems and methods for authoring and modifying presentation conversation files or logs.

BACKGROUND

Traditional authoring tools for uni- and multimodal output systems require entirely human directed input and are not supported beyond the system's ability to spot spelling or grammatical mistakes. Further, the authoring tools are limited to the use of mouse and keyboard as input modalities. Some authoring tools may allow speech as an input for transcription (e.g., the speech is simply converted to text). In these authoring tools, autocomplete functionality does not go beyond specific variable and function names or simple template-based authoring. Accordingly, new authoring tools are needed in order to make authoring content more efficient.

SUMMARY

In some implementations of the system, the computing device may include a robot computing device, a chatbot, a voice recognition computing device, or an artificial intelligence computing device.

Another aspect of the present disclosure relates to a method for authoring and modifying presentation conversation files. The method may include receiving, at a renderer module, voice files, visual effect files, facial expression files, gesture files, and/or mobility files. The method may include analyzing, by the language processor module, the voice files, the visual effect files, the facial expression files, and/or mobility files and follow guidelines of a multimodal authoring system. The method may include generating, by the renderer module, one or more presentation conversation files based at least in part on the received gesture files, voice files, visual effect files, facial expression files, and/or mobility files. The method may include testing, at an automatic testing system, the one or more presentation conversation files to verify correct operation of a computing device that receives the one or more presentation conversation files as an input. The method may include identifying, by a multimodal review module, changes to be made to the gesture files, voice input files, the visual effect files, the facial expression files, and/or the mobility files.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of 'a', 'an', and 'the' include plural referents unless the context clearly dictates otherwise.

DETAILED DESCRIPTION

Figure 1A:
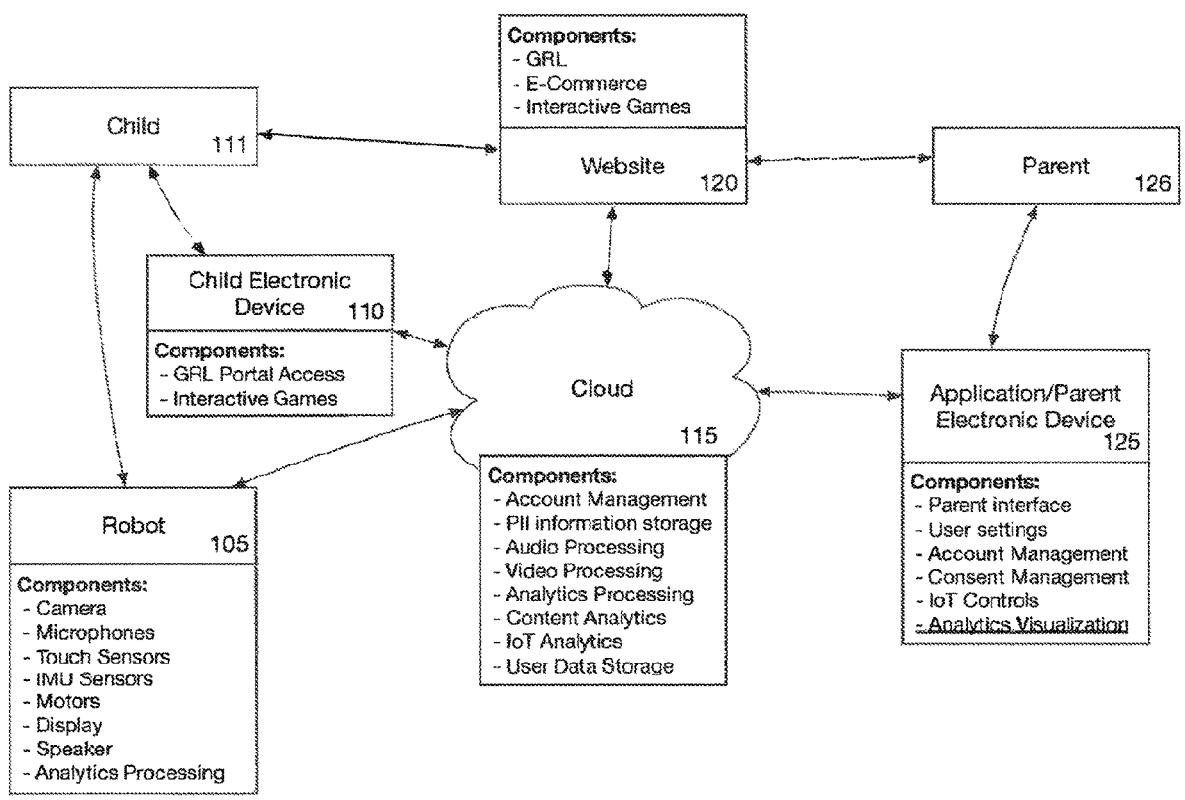
FIG. 1A illustrates a system for a social robot or digital companion to engage a child and/or a parent, in accordance with one or more implementations.

The following detailed description and provides a better understanding of the features and advantages of the inventions described in the present disclosure in accordance with the embodiments disclosed herein. Although the detailed description includes many specific embodiments, these are provided by way of example only and should not be construed as limiting the scope of the inventions disclosed herein.

In some implementations, advanced artificial companions and/or robot computing devices increasingly have specifically designed personas and personalities, possess specific skills, address a segment of the market (e.g., children vs. adults), and are programmed to avoid certain areas of conversation (violence, sexual topics, etc.). In some implementations, these personalities are carefully designed with limitations and/or constraints and violations of these constraints can have significant impact on the developed brand that is personified by these artificial companions or robot computing devices. In other words, if a violation occurs then the artificial companions and/or robot computing devices may shut down or not operate correctly. Current authoring tools do not provide aid, suggestions, or corrections to the human author identifying respective skills and dialog for the artificial companions or robot computing to effectively avoid such pitfalls.

Further, current authoring tools are limited to input from keyboard and mouse. These authoring tools do not accept as direct input visual files or logs, acoustic files or logs, and other input files. In some implementations, the multimodal authoring system described and claimed herein allows and utilizes visual files or logs, acoustic files or logs, mobility files or logs, gesture files or logs, and other input files to efficiently create content for the digital companion or robot computing device.

While speech synthesis systems, graphical animation systems, special effects engines, and robotic devices have improved significantly over the past few years, these systems and devices still have limitations and/or drawbacks. These systems remain far from perfect and rendering a performance, presentation, or output to an acceptable standard still requires considerable manual intervention. Further, current authoring tools are limited in their ability to effectively coach authors and review multimodal output performances or presentations. Accordingly, the multimodal authoring system described and claimed herein, automatically generates multimodal markup which is based on (or takes into consideration) several possible inputs, which may include, but is not limited to prior markup of similar content, sentiment of language in content, quality of the rendered performance or presentation (poor or good), affect of sound and graphic special effects, and/or context of one markup modality to the other.

Automatic speech recognition has come a long way and has improved considerably over the last few years due to the training of deep machine learning models with enormous amounts of data. However, general speech recognition still remains a difficult and error prone task. Accordingly, the multimodal authoring system described and claimed herein, understands the context of speech input and/or expected speech input (e.g., it is important to distinguish, if a user is talking about "bats" to know if a user if a user is talking about sports or animals). Current authoring tools do not include such features or functionality. In addition, the multimodal authoring system described and claimed herein may automatically provide phrase hints (e.g., suggested phrase files or expected input speech vocabulary) to the automatic speech recognition based on the current context and other expected vocabulary (e.g., the user's name, vocabulary specific to topics (e.g., finance, animals, sports, etc.)).

The combinatorial complexity of branching and looping that occurs in conversational flows makes it difficult, if not impossible, to manually test all possible outcomes of how a conversation may flow. Current conversational flow authoring tools only provide limited support for automatic testing of complex multimodal interaction. In addition, current authoring systems do not allow easy loading, modification and/or replaying of existing conversation logs or files.

In some implementations, the multimodal authoring tools and systems described herein utilize artificial neural networks trained on information gathered from several possible inputs, which may include, but are not limited to prior markup of similar content, sentiment of language in content, quality of the rendered performance or presentation (poor or good), affect of sound and graphic special effects, and/or context of one markup modality to the other, as well as other rule- and pattern-based analysis to provide automatic autocompletion of multimodal content and easy markup of content. Similar artificial neural networks and pattern-based methods are used for validation and testing of content before the content is implemented in an artificial companion or robot computing device, and to verify and generate content that is in accordance with target personalities of the conversation agent into the content. In some implementations, these multimodal authoring tools described and claimed herein are able to accept multimodal input (e.g., audio or video files, videos of a multimodal performance or presentation, etc.) for creating content (e.g., gesture markup, voice markup, effect markup, and/or mobility markup). The multimodal authoring tool described herein provides significant advantages over current authoring tools.

In other words, computer-readable instructions executable by one or more processors of a computing device may include autocomplete functionality that can be utilized in the generation of the text files or logs, voice files or logs, gesture files or logs, facial expression files or logs, special effects files or logs, and/or graphical output files or logs.

In some implementations, the multimodal authoring system described and claimed herein automatically provides suggestions to the human author with respect to the multimodal content being generated. In some implementations, the suggestions for the multimodal content may be based on the current context of the digital companion or robot computing device, the digital companion or robot computing device's a) personality; b) requirements; c) typical vocabulary: d) target user group; e) target user group's abilities and/or f) target user group's needs. In other words, as gesture markup content, voice markup content and/or effect markup content is being generated, the multimodal authoring system may make suggestions based on the factors or characteristics listed above. In some cases, the editor module 320, the language processor module 325, the gesture markup module 360, the voice markup module 355, mobility markup module 352, the automatic testing system 330, and/or the effect markup module 350 may have this functionality for providing suggestions to the human author.

In some implementations, the multimodal authoring system described and claimed herein utilizes one or more cameras, one or more microphones and/or motion capture software as inputs to allow an author to create and/or generate performances or presentations (e.g., presentation conversation files or logs). In some implementations, the multimodal authoring system may generate performances or presentations utilizing the author's behavioral input and artistic performances, including, but not limited to speech, voice, facial expressions, and/or gestures, which are captured by the one or more cameras, one or more microphones and/or motion capture software.

In some implementations, the multimodal authoring system described and claimed herein may, if the human author or content generator violates set and established guidelines and/or learned requirements for the artificial companion or the robot computing device, automatically correct, review, and coach the human author or content generator on their violations of the guidelines and/or requirements. In some implementations, the language processor module 325, the gesture markup module 360, the voice markup module 355, and the effect markup module 350 may perform the automatic correction, reviewing and coaching herein.

In some implementations, the multimodal authoring system described and claimed herein may be able to improve subsequent automatic speech recognition performance. In some embodiments, the multimodal authoring system may automatically produce phrase hints or suggest conversation logs or files that are provided to the automatic speech recognition algorithm to improve its performance, based on the current context, expected vocabulary, and prior authored input. In some implementations, the language processor module 325 may generate the phrase hints described herein.

In some implementations, the multimodal authoring system described and claimed herein, may be able to learn from existing written content, multimodal markup and/or presentation conversation files or logs. In some implementations, the multimodal authoring system may be able to automatically generate similar markup or presentation conversation files or logs based on sentiment of existing presentation conversation logs, affect existing presentation conversation logs, context existing presentation conversation logs, and other variables.

In some implementations, the multimodal authoring system described and claimed herein, may receive a completely marked-up conversation interaction file or log. In some implementations, the multimodal authoring system (e.g., the language processor module) may also receive a recommendation, command and/or instruction to change a characteristic and/or parameter of the conversation interaction. For example, the conversation interaction characteristics or parameters may be genre or mood. For example, the change may be in conversation interaction mood (e.g., changing from happy to sad). In some implementations, in response to the recommendation to change a conversation interaction characteristic or parameter, the multimodal authoring system may generate a new conversation interaction file or log with the identified characteristic or parameter.

In some implementations, the multimodal authoring system described and claimed herein may be able to allow for an interactive process where the multimodal authoring system learns acceptable paths through complex conversation dialogs. In some implementations, the multimodal authoring system may further automatically generate synonym alternative conversation paths based on analyzing the current presentation conversation files or logs and/or past presentation conversation files or logs. In some implementations, for example, the multimodal authoring system may identify an acceptable conversation path "that a user can pick tiger as their favorite animal" and automatically generate alternative pathways that are also acceptable answers ("elephant, dog, cat or cheetah"). In some implementations, the language processor module 325 may be able to perform the generation of these alternative answers as acceptable answers. In some implementations, the multimodal authoring system may communicate the alternative conversation paths to the renderer module 335 and then to the automatic testing system 330 for testing and verification of the validity of the alternative conversation paths.

In some implementations, the multimodal authoring system described and claimed herein may be to leverage past completed performances of the artificial companion and/or robot computing device and can modify the generated content (or presentation conversation files or logs) based on the review of the past completed artificial companion performances or presentations. In some implementations, a performance analyzer module 365 may receive past completed performances and/or measurements or parameters of the completed performances or presentations and analyze how well the past presentation conversation files or logs functioned in the real artificial companion. In some implementations, the performance analyzer module 365 generates recommendations on how to modify the presentation conversation files or logs and communicate these recommendations to the editor module 320. In some implementations, the editor module may receive the recommendations and may generate modified presentation conversation files or logs based on the recommendations. In some implementations, the modified presentation conversation files or logs may be tested by the automatic testing system 330 after the modified presentation conversation files or logs have been checked by the language processor module 325 and rendered by the renderer module 335. This allows the multimodal authoring system to immediately or very quickly review the impact on the presentation of the digital companion with respect to the modified presentation conversation files or logs, which were generated in response to real digital companions or robot computing devices executing the performances or presentations.

Figure 1B:
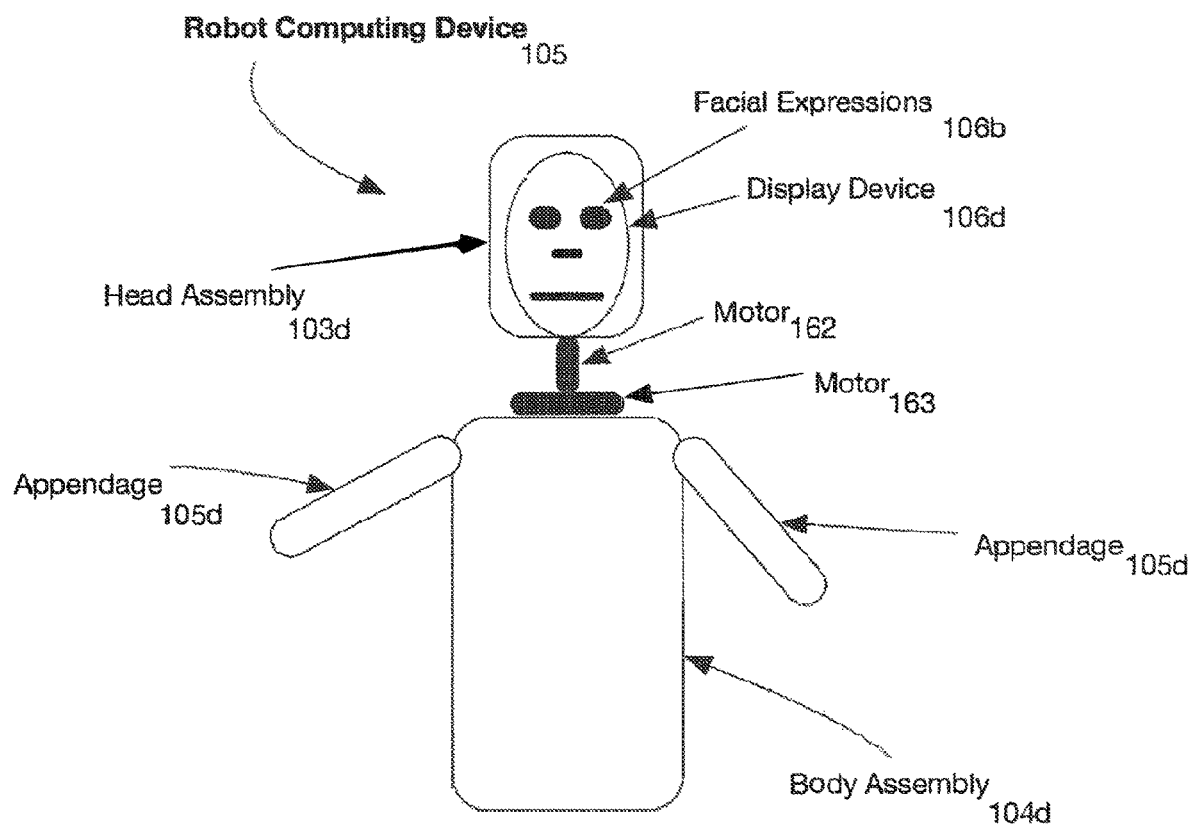
FIG. 1B illustrates a social robot or digital companion, in accordance with one or more implementations.
Figure 1C:
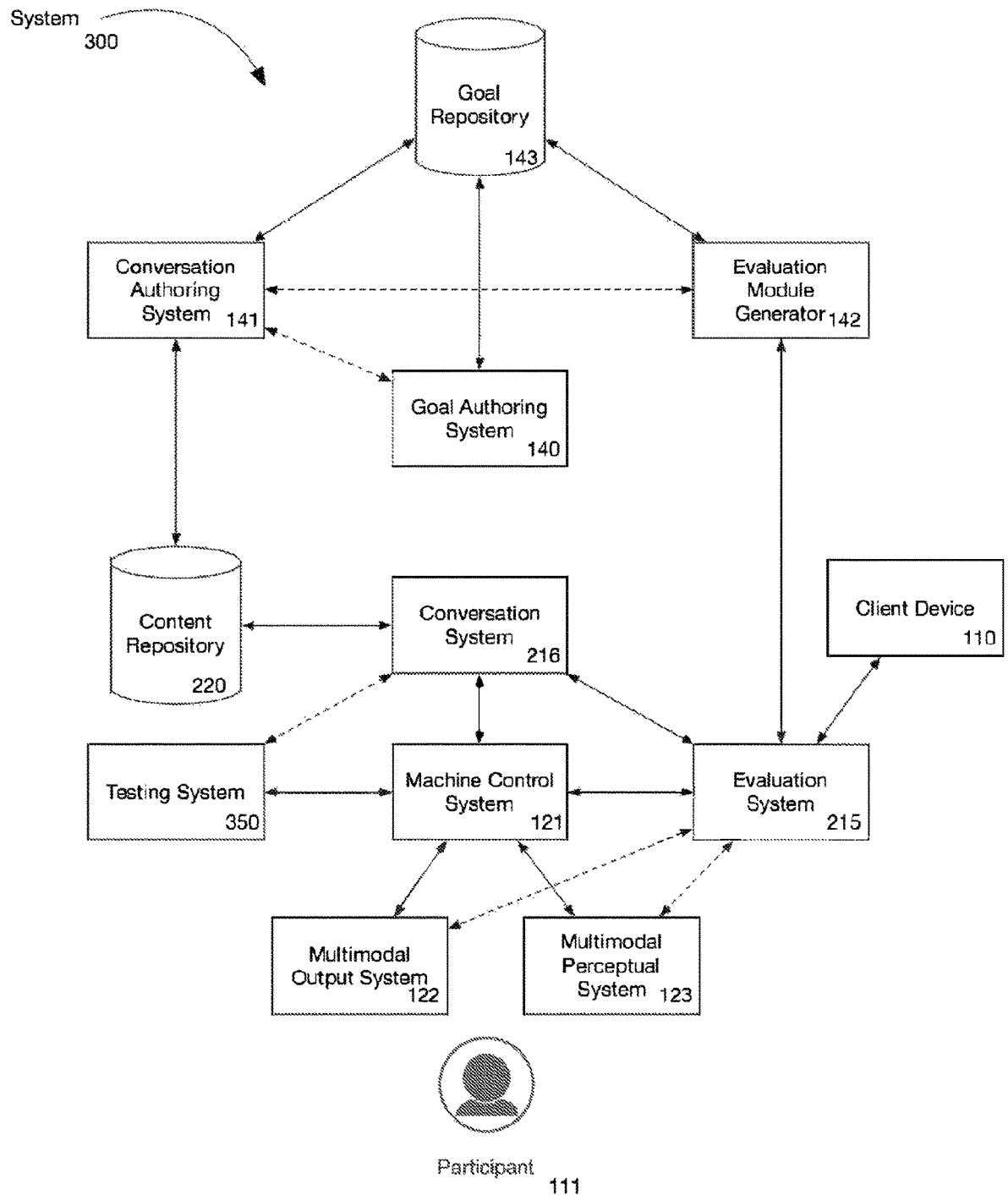
FIG. 1C illustrates modules or subsystems in a system where a child engages with a social robot or digital companion, in accordance with one or more implementations.

FIG. 1A illustrates a system for a social robot or digital companion to engage a child and/or a parent, in accordance with one or more implementations. FIG. 1C illustrates modules or subsystems in a system where a child engages with a social robot or digital companion, in accordance with one or more implementations. FIG. 1B illustrates a social robot or digital companion, in accordance with one or more implementations. In some implementations, a robot computing device 105 (or digital companion) may engage with a child and establish communication interactions with the child. In some implementations, there will be bidirectional communication between the robot computing device 105 and the child 111 with a goal of establishing multi-turn conversations (e.g., both parties taking conversation turns) in the communication interactions. In some implementations, the robot computing device 105 may communicate with the child via spoken words (e.g., audio actions), visual actions (movement of eyes or facial expressions on a display screen), and/or physical actions (e.g., movement of a neck or head or an appendage of a robot computing device). In some implementations, the robot computing device 105 may utilize imaging devices to evaluate a child's body language, a child's facial expressions and may utilize speech recognition software to evaluate and analyze the child's speech.

In some implementations, the child may also have one or more electronic devices 110. In some implementations, the one or more electronic devices 110 may allow a child to login to a website on a server computing device in order to access a learning laboratory and/or to engage in interactive games that are housed on the web site. In some implementations, the child's one or more computing devices 110 may communicate with cloud computing devices 115 in order to access the website 120. In some implementations, the website 120 may be housed on server computing devices. In some implementations, the website 120 may include the learning laboratory (which may be referred to as a global robotics laboratory (GRL) where a child can interact with digital characters or personas that are associated with the robot computing device 105. In some implementations, the website 120 may include interactive games where the child can engage in competitions or goal setting exercises. In some implementations, other users may be able to interface with an e-commerce website or program, where the other users (e.g., parents or guardians) may purchases items that are associated with the robot (e.g., comic books, toys, badges or other affiliate items).

In some implementations, the robot computing device or digital companion 105 may include one or more imaging devices, one or more microphones, one or more touch sensors, one or more IMU sensors, one or more motors and/or motor controllers, one or more display devices or monitors and/or one or more speakers. In some implementations, the robot computing devices may include one or more processors, one or more memory devices, and/or one or more wireless communication transceivers. In some implementations, computer-readable instructions may be stored in the one or more memory devices and may be executable to perform numerous actions, features and/or functions. In some implementations, the robot computing device may perform analytics processing on data, parameters and/or measurements, audio files and/or image files captured and/or obtained from the components of the robot computing device listed above.

In some implementations, the one or more touch sensors may measure if a user (child, parent or guardian) touches the robot computing device or if another object or individual comes into contact with the robot computing device. In some implementations, the one or more touch sensors may measure a force of the touch and/or dimensions of the touch to determine, for example, if it is an exploratory touch, a push away, a hug or another type of action. In some implementations, for example, the touch sensors may be located or positioned on a front and back of an appendage or a hand of the robot computing device or on a stomach area of the robot computing device. Thus, the software and/or the touch sensors may determine if a child is shaking a hand or grabbing a hand of the robot computing device or if they are rubbing the stomach of the robot computing device. In some implementations, other touch sensors may determine if the child is hugging the robot computing device. In some implementations, the touch sensors may be utilized in conjunction with other robot computing device software where the robot computing device could tell a child to hold their left hand if they want to follow one path of a story of hold a left hand if they want to follow the other path of a story.

In some implementations, the one or more imaging devices may capture images and/or video of a child, parent or guardian interacting with the robot computing device. In some implementations, the one or more imaging devices may capture images and/or video of the area around the child, parent or guardian. In some implementations, the one or more microphones may capture sound or verbal commands spoken by the child, parent or guardian. In some implementations, computer-readable instructions executable by the processor or an audio processing device may convert the captured sounds or utterances into audio files for processing.

In some implementations, the one or more IMU sensors may measure velocity, acceleration, orientation and/or location of different parts of the robot computing device. In some implementations, for example, the IMU sensors may determine a speed of movement of an appendage or a neck. In some implementations, for example, the IMU sensors may determine an orientation of a section or the robot computing device, for example of a neck, a head, a body or an appendage in order to identify if the hand is waving or In a rest position. In some implementations, the use of the IMU sensors may allow the robot computing device to orient its different sections in order to appear more friendly or engaging to the user.

In some implementations, the robot computing device may have one or more motors and/or motor controllers. In some implementations, the computer-readable instructions may be executable by the one or more processors and commands or instructions may be communicated to the one or more motor controllers to send signals or commands to the motors to cause the motors to move sections of the robot computing device. In some implementations, the sections may include appendages or arms of the robot computing device and/or a neck or a head of the robot computing device.

In some implementations, the robot computing device may include a display or monitor. In some implementations, the monitor may allow the robot computing device to display facial expressions (e.g., eyes, nose, mouth expressions) as well as to display video or messages to the child, parent or guardian.

In some implementations, the robot computing device may include one or more speakers, which may be referred to as an output modality. In some implementations, the one or more speakers may enable or allow the robot computing device to communicate words, phrases and/or sentences and thus engage in conversations with the user. In addition, the one or more speakers may emit audio sounds or music for the child, parent or guardian when they are performing actions and/or engaging with the robot computing device.

In some implementations, the system may include a parent computing device 125. In some implementations, the parent computing device 125 may include one or more processors and/or one or more memory devices. In some implementations, computer-readable instructions may be executable by the one or more processors to cause the parent computing device 125 to perform a number of features and/or functions. In some implementations, these features and functions may include generating and running a parent interface for the system. In some implementations, the software executable by the parent computing device 125 may also alter user (e.g., child, parent or guardian) settings. In some implementations, the software executable by the parent computing device 125 may also allow the parent or guardian to manage their own account or their child's account in the system. In some implementations, the software executable by the parent computing device 125 may allow the parent or guardian to initiate or complete parental consent to allow certain features of the robot computing device to be utilized. In some implementations, the software executable by the parent computing device 125 may allow a parent or guardian to set goals or thresholds or settings what is captured from the robot computing device and what is analyzed and/or utilized by the system. In some implementations, the software executable by the one or more processors of the parent computing device 125 may allow the parent or guardian to view the different analytics generated by the system in order to see how the robot computing device is operating, how their child is progressing against established goals, and/or how the child is interacting with the robot computing device.

In some implementations, the system may include a cloud server computing device 115. In some implementations, the cloud server computing device 115 may include one or more processors and one or more memory devices. In some implementations, computer-readable instructions may be retrieved from the one or more memory devices and executable by the one or more processors to cause the cloud server computing device 115 to perform calculations and/or additional functions. In some implementations, the software (e.g., the computer-readable instructions executable by the one or more processors) may manage accounts for all the users (e.g., the child, the parent and/or the guardian). In some implementations, the software may also manage the storage of personally identifiable information in the one or more memory devices of the cloud server computing device 115. In some implementations, the software may also execute the audio processing (e.g., speech recognition and/or context recognition) of sound files that are captured from the child, parent or guardian, as well as generating speech and related audio file that may be spoken by the robot computing device 115. In some implementations, the software in the cloud server computing device 115 may perform and/or manage the video processing of images that are received from the robot computing devices.

In some implementations, the software of the cloud server computing device 115 may analyze received inputs from the various sensors and/or other input modalities as well as gather information from other software applications as to the child's progress towards achieving set goals. In some implementations, the cloud server computing device software may be executable by the one or more processors in order perform analytics processing. In some implementations, analytics processing may be behavior analysis on how well the child is doing with respect to established goals.

In some implementations, the software of the cloud server computing device may receive input regarding how the user or child is responding to content, for example, does the child like the story, the augmented content, and/or the output being generated by the one or more output modalities of the robot computing device. In some implementations, the cloud server computing device may receive the input regarding the child's response to the content and may perform analytics on how well the content is working and whether or not certain portions of the content may not be working (e.g., perceived as boring or potentially malfunctioning or not working).

In some implementations, the software of the cloud server computing device may receive inputs such as parameters or measurements from hardware components of the robot computing device such as the sensors, the batteries, the motors, the display and/or other components. In some implementations, the software of the cloud server computing device may receive the parameters and/or measurements from the hardware components and may perform IOT Analytics processing on the received parameters, measurements or data to determine if the robot computing device is malfunctioning and/or not operating at an optimal manner.

In some implementations, the cloud server computing device 115 may include one or more memory devices. In some implementations, portions of the one or more memory devices may store user data for the various account holders. In some implementations, the user data may be user address, user goals, user details and/or preferences. In some implementations, the user data may be encrypted and/or the storage may be a secure storage.

FIG. 1C illustrates functional modules of a system including a robot computing device according to some implementations. In some embodiments, at least one method described herein is performed by a system 300 that includes the conversation system 1216, a machine control system 121, a multimodal output system 122, a multimodal perceptual system 123, and an evaluation system 215. In some implementations, at least one of the conversation system 216, a machine control system 121, a multimodal output system 122, a multimodal perceptual system 123, and an evaluation system 215 may be included in a robot computing device or a machine. In some embodiments, the machine is a robot, a robot computing device, a digital companion, and/or computing devices that have facial recognition software, gesture analysis software, speech recognition software, and/or sound recognition software. In the specification, terms may be utilized interchangeably (e.g., robot computing device, machine, digital companion, etc.; or conversation engine, conversation system, conversation module and/or conversation agent.) In some implementations, the conversation system 216 may be communicatively coupled to control system 121 of the machine. In some embodiments, the conversation system may be communicatively coupled to the evaluation system 215. In some implementations, the conversation system 216 may be communicatively coupled to a conversational content repository 220. In some implementations, the conversation system 216 may be communicatively coupled to a conversation testing system. In some implementations, the conversation system 216 may be communicatively coupled to a conversation authoring system 360. In some implementations, the conversation system 216 may be communicatively coupled to a goal authoring system 140. In some implementations, the conversation system 216 may be a cloud-based conversation system provided by a conversation system server that is communicatively coupled to the control system 121 via the Internet. In some implementations, the conversation system may be the Embodied Chat Operating System.

In some implementations, the conversation system 216 may be an embedded conversation system that is included in the robot computing device or implementations. In some implementations, the control system 121 may be constructed to control a multimodal output system 122 and a multi modal perceptual system 123 that includes at least one sensor. In some implementations, the control system 121 may be constructed to interact with the conversation system 216. In some implementations, the machine or robot computing device may include the multimodal output system 122. In some implementations, the multimodal output system 122 may include at least one of an audio output sub-system, a video display sub-system, a mechanical robotic subsystem, a light emission sub-system, a LED (Light Emitting Diode) ring, and/or a LED (Light Emitting Diode) array. In some implementations, the machine or robot computing device may include the multimodal perceptual system 123, wherein the multimodal perceptual system 123 may include the at least one sensor. In some implementations, the multimodal perceptual system 123 includes at least one of a sensor of a heat detection sub-system, a sensor of a video capture sub-system, a sensor of an audio capture sub-system, a touch sensor, a piezoelectric pressor sensor, a capacitive touch sensor, a resistive touch sensor, a blood pressure sensor, a heart rate sensor, and/or a biometric sensor. In some implementations, the evaluation system 215 may be communicatively coupled to the control system 121. In some implementations, the evaluation system 130 may be communicatively coupled to the multimodal output system 122. In some implementations, the evaluation system 215 may be communicatively coupled to the multimodal perceptual system 123. In some implementations, the evaluation system 215 may be communicatively coupled to the conversation system 216. In some implementations, the evaluation system 215 may be communicatively coupled to a client device 110 (e.g., a parent or guardian's mobile device or computing device). In some implementations, the evaluation system 215 may be communicatively coupled to the goal authoring system 140. In some implementations, the evaluation system 215 may include computer-readable-instructions of a goal evaluation module that, when executed by the evaluation system, may control the evaluation system 215 to process information generated from the multimodal perceptual system 123 to evaluate a goal associated with conversational content processed by the conversation system 216. In some implementations, the goal evaluation module is generated based on information provided by the goal authoring system 140.

In some implementations, the goal evaluation module 215 may be generated based on information provided by the conversation authoring system 160. In some embodiments, the goal evaluation module 215 may be generated by an evaluation module generator 142. In some implementations, the conversation testing system may receive user input from a test operator and may provide the control system 121 with multimodal output instructions (either directly or via the conversation system 216). In some implementations, the conversation testing system 350 may receive event information indicating a human response sensed by the machine or robot computing device (either directly from the control system 121 or via the conversation system 216). In some implementations, the conversation authoring system 141 may be constructed to generate conversational content and store the conversational content in one of the content repository 220 and the conversation system 216. In some implementations, responsive to updating of content currently used by the conversation system 216, the conversation system may be constructed to store the updated content at the content repository 220.

In some embodiments, the goal authoring system 140 may be constructed to generate goal definition information that is used to generate conversational content. In some implementations, the goal authoring system 140 may be constructed to store the generated goal definition information in a goal repository 143. In some implementations, the goal authoring system 140 may be constructed to provide the goal definition information to the conversation authoring system 141. In some implementations, the goal authoring system 143 may provide a goal definition user interface to a client device that includes fields for receiving user-provided goal definition information. In some embodiments, the goal definition information specifies a goal evaluation module that is to be used to evaluate the goal. In some implementations, each goal evaluation module is at least one of a sub-system of the evaluation system 215 and a sub-system of the multimodal perceptual system 123. In some embodiments, each goal evaluation module uses at least one of a sub-system of the evaluation system 215 and a sub-system of the multimodal perceptual system 123. In some implementations, the goal authoring system 140 may be constructed to determine available goal evaluation modules by communicating with the machine or robot computing device, and update the goal definition user interface to display the determined available goal evaluation modules.

In some implementations, the goal definition information defines goal levels for goal. In some embodiments, the goal authoring system 140 defines the goal levels based on information received from the client device (e.g., user-entered data provided via the goal definition user interface). In some embodiments, the goal authoring system 140 automatically defines the goal levels based on a template. In some embodiments, the goal authoring system 140 automatically defines the goal levels based information provided by the goal repository 143, which stores information of goal levels defined form similar goals. In some implementations, the goal definition information defines participant support levels for a goal level. In some embodiments, the goal authoring system 140 defines the participant support levels based on information received from the client device (e.g., user-entered data provided via the goal definition user interface). In some implementations, the goal authoring system 140 may automatically define the participant support levels based on a template. In some embodiments, the goal authoring system 140 may automatically define the participant support levels based on information provided by the goal repository 143, which stores information of participant support levels defined form similar goal levels. In some implementations, conversational content includes goal information indicating that a specific goal should be evaluated, and the conversational system 216 may provide an instruction to the evaluation system 215 (either directly or via the control system 121) to enable the associated goal evaluation module at the evaluation system 215. In a case where the goal evaluation module is enabled, the evaluation system 215 executes the instructions of the goal evaluation module to process information generated from the multimodal perceptual system 123 and generate evaluation information. In some implementations, the evaluation system 215 provides generated evaluation information to the conversation system 215 (either directly or via the control system 121). In some implementations, the evaluation system 215 may update the current conversational content at the conversation system 216 or may select new conversational content at the conversation system 100 (either directly or via the control system 121), based on the evaluation information.

FIG. 1B illustrates a robot computing device according to some implementations. In some implementations, the robot computing device 105 may be a machine, a digital companion, an electro-mechanical device including computing devices. These terms may be utilized interchangeably in the specification. In some implementations, as shown in FIG. 1B, the robot computing device 105 may include a head assembly 103*d*, a display device 106*d*, at least one mechanical appendage 105*d* (two are shown in FIG. 1B), a body assembly 104*d*, a vertical axis rotation motor 163, and/or a horizontal axis rotation motor 162. In some implementations, the robot computing device may include a multimodal output system 122 and the multimodal perceptual system 123 (not shown in FIG. 1B, but shown in FIG. 2 below). In some implementations, the display device 106*d* may allow facial expressions 106*b* to be shown or illustrated after being generated. In some implementations, the facial expressions 106*b* may be shown by the two or more digital eyes, a digital nose and/or a digital mouth. In some implementations, other images or parts may be utilized to show facial expressions. In some implementations, the horizontal axis rotation motor 163 may allow the head assembly 103*d* to move from side-to-side which allows the head assembly 103*d* to mimic human neck movement like shaking a human's head from side-to-side. In some implementations, the vertical axis rotation motor 162 may allow the head assembly 103*d* to move in an up-and-down direction like shaking a human's head up and down. In some implementations, an additional motor may be utilized to move the robot computing device (e.g., the entire robot or computing device) to a new position or geographic location in a room or space (or even another room). In this implementation, the additional motor may be connected to a drive system that causes wheels, tires or treads to rotate and thus physically move the robot computing device.

In some implementations, the body assembly 104*d* may include one or more touch sensors. In some implementations, the body assembly's touch sensor(s) may allow the robot computing device to determine if it is being touched or hugged. In some implementations, the one or more appendages 105*d* may have one or more touch sensors. In some implementations, some of the one or more touch sensors may be located at an end of the appendages 105*d* (which may represent the hands). In some implementations, this allows the robot computing device 105 to determine if a user or child is touching the end of the appendage (which may represent the user shaking the user's hand).

Figure 2:
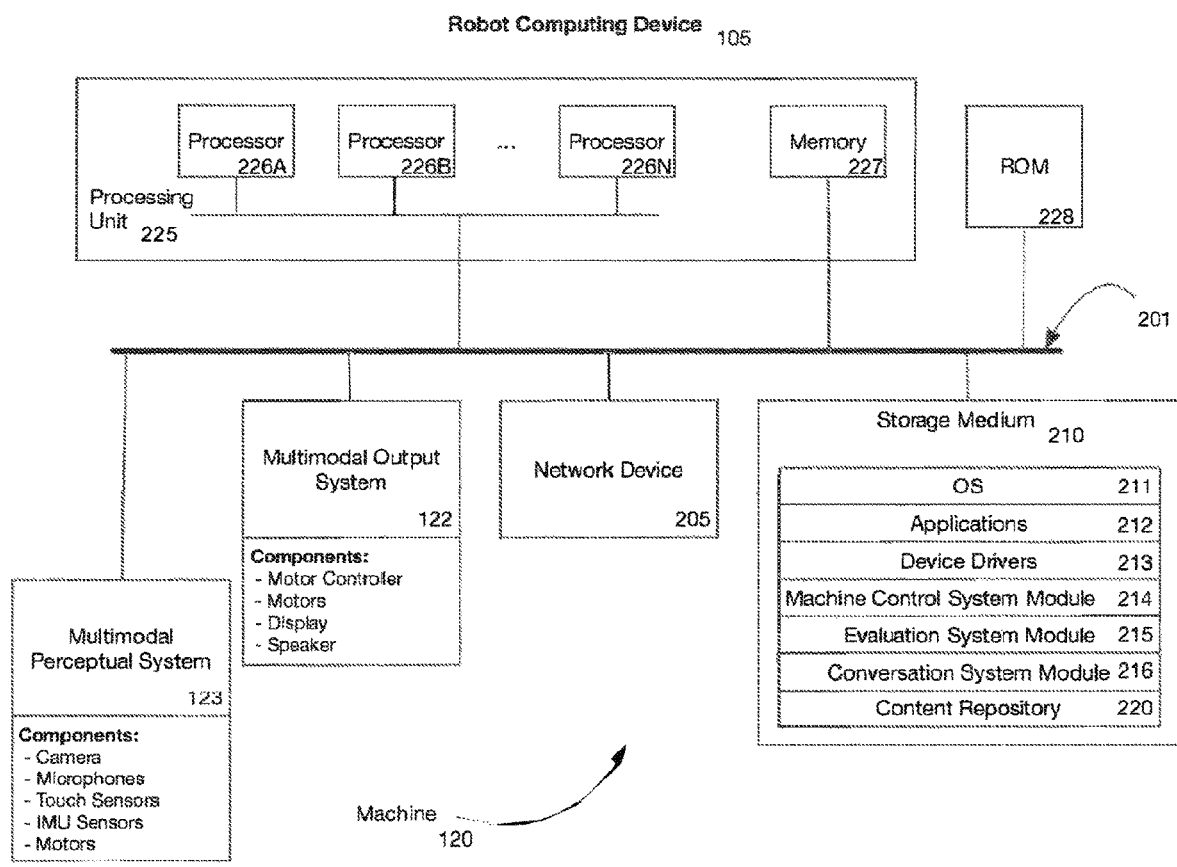
FIG. 2 illustrates a system architecture of an exemplary robot computing device, according to some implementations.

FIG. 2 is a diagram depicting system architecture of robot computing device (e.g., 105 of FIG. 1B), according to implementations. In some implementations, the robot computing device or system of FIG. 2 may be implemented as a single hardware device. In some implementations, the robot computing device and system of FIG. 2 may be implemented as a plurality of hardware devices. In some implementations, the robot computing device and system of FIG. 2 may be implemented as an ASIC (Application-Specific Integrated Circuit). In some implementations, the robot computing device and system of FIG. 2 may be implemented as an FPGA (Field-Programmable Gate Array). In some implementations, the robot computing device and system of FIG. 2 may be implemented as a SoC (System-on-Chip). In some implementations, the bus 201 may interface with the processors 226A-N, the main memory 227 (e.g., a random access memory (RAM)), a read only memory (ROM) 228, one or more processor-readable storage mediums 210, and one or more network device 211. In some implementations, bus 201 interfaces with at least one of a display device (e.g., 102c) and a user input device. In some implementations, bus 101 interfaces with the multi-modal output system 122. In some implementations, the multi-modal output system 122 may include an audio output controller. In some implementations, the multi-modal output system 122 may include a speaker. In some implementations, the multi-modal output system 122 may include a display system or monitor. In some implementations, the multi-modal output system 122 may include a motor controller. In some implementations, the motor controller may be constructed to control the one or more appendages (e.g., 105d) of the robot system of FIG. 1B. In some implementations, the motor controller may be constructed to control a motor of an appendage (e.g., 105d) of the robot system of FIG. 1B. In some implementations, the motor controller may be constructed to control a motor (e.g., a motor of a motorized, a mechanical robot appendage).

In some implementations, a bus 201 may interface with the multi-modal perceptual system 123 (which may be referred to as a multi-modal input system or multi-modal input modalities. In some implementations, the multi-modal perceptual system 123 may include one or more audio input processors. In some implementations, the multi-modal perceptual system 123 may include a human reaction detection sub-system. In some implementations, the multimodal perceptual system 123 may include one or more microphones. In some implementations, the multimodal perceptual system 123 may include one or more camera(s) or imaging devices.

In some implementations, the one or more processors 226A-226N may include one or more of an ARM processor, an X86 processor, a GPU (Graphics Processing Unit), and the like. In some implementations, at least one of the processors may include at least one arithmetic logic unit (ALU) that supports a SIMD (Single Instruction Multiple Data) system that provides native support for multiply and accumulate operations.

In some implementations, at least one of a central processing unit (processor), a GPU, and a multi-processor unit (MPU) may be included. In some implementations, the processors and the main memory form a processing unit 225. In some implementations, the processing unit 225 includes one or more processors communicatively coupled to one or more of a RAM, ROM, and computer-readable storage medium; the one or more processors of the processing unit receive instructions stored by the one or more of a RAM, ROM, and computer-readable storage medium via a bus; and the one or more processors execute the received instructions. In some implementations, the processing unit is an ASIC (Application-Specific Integrated Circuit).

In some implementations, the processing unit may be a SoC (System-on-Chip). In some implementations, the processing unit may include at least one arithmetic logic unit (ALU) that supports a SIMD (Single Instruction Multiple Data) system that provides native support for multiply and accumulate operations. In some implementations the processing unit is a Central Processing Unit such as an Intel Xeon processor. In other implementations, the processing unit includes a Graphical Processing Unit such as NVIDIA Tesla.

In some implementations, the one or more network adapter devices or network interface devices 205 may provide one or more wired or wireless interfaces for exchanging data and commands. Such wired and wireless interfaces include, for example, a universal serial bus (USB) interface, Bluetooth interface, Wi-Fi interface, Ethernet interface, near field communication (NFC) interface, and the like. In some implementations, the one or more network adapter devices or network interface devices 205 may be wireless communication devices. In some implementations, the one or more network adapter devices or network interface devices 205 may include personal area network (PAN) transceivers, wide area network communication transceivers and/or cellular communication transceivers.

In some implementations, the one or more network devices 205 may be communicatively coupled to another robot computing device (e.g., a robot computing device similar to the robot computing device 105 of FIG. 1B). In some implementations, the one or more network devices 205 may be communicatively coupled to an evaluation system module (e.g., 215). In some implementations, the one or more network devices 205 may be communicatively coupled to a conversation system module (e.g., 110). In some implementations, the one or more network devices 205 may be communicatively coupled to a testing system. In some implementations, the one or more network devices 205 may be communicatively coupled to a content repository (e.g., 220). In some implementations, the one or more network devices 205 may be communicatively coupled to a client computing device (e.g., 110). In some implementations, the one or more network devices 205 may be communicatively coupled to a conversation authoring system (e.g., 160). In some implementations, the one or more network devices 205 may be communicatively coupled to an evaluation module generator. In some implementations, the one or more network devices may be communicatively coupled to a goal authoring system. In some implementations, the one or more network devices 205 may be communicatively coupled to a goal repository. In some implementations, computer-executable instructions in software programs (such as an operating system 211, application programs 212, and device drivers 213) may be loaded into the one or more memory devices (of the processing unit) from the processor-readable storage medium, the ROM or any other storage location. During execution of these software programs, the respective computer-executable instructions may be accessed by at least one of processors 226A-226N (of the processing unit) via the bus 201, and then may be executed by at least one of processors. Data used by the software programs may also be stored in the one or more memory devices, and such data is accessed by at least one of one or more processors 226A-226N during execution of the computer-executable instructions of the software programs.

In some implementations, the processor-readable storage medium 210 may be one of (or a combination of two or more of) a hard drive, a flash drive, a DVD, a CD, an optical disk, a floppy disk, a flash storage, a solid-state drive, a ROM, an EEPROM, an electronic circuit, a semiconductor memory device, and the like. In some implementations, the processor-readable storage medium 210 may include computer-executable instructions (and related data) for an operating system 211, software programs or application software 212, device drivers 213, and computer-executable instructions for one or more of the processors 226A-226N of FIG. 2.

In some implementations, the processor-readable storage medium 210 may include a machine control system module 214 that includes computer-executable instructions for controlling the robot computing device to perform processes performed by the machine control system, such as moving the head assembly of robot computing device.

In some implementations, the processor-readable storage medium 210 may include an evaluation system module 215 that includes computer-executable instructions for controlling the robotic computing device to perform processes performed by the evaluation system. In some implementations, the processor-readable storage medium 210 may include a conversation system module 216 that may include computer-executable instructions for controlling the robot computing device 105 to perform processes performed by the conversation system. In some implementations, the processor-readable storage medium 210 may include computer-executable instructions for controlling the robot computing device 105 to perform processes performed by the testing system. In some implementations, the processor-readable storage medium 210, computer-executable instructions for controlling the robot computing device 105 to perform processes performed by the conversation authoring system.

In some implementations, the processor-readable storage medium 210, computer-executable instructions for controlling the robot computing device 105 to perform processes performed by the goal authoring system. In some implementations, the processor-readable storage medium 210 may include computer-executable instructions for controlling the robot computing device 105 to perform processes performed by the evaluation module generator.

In some implementations, the processor-readable storage medium 210 may include the content repository 220. In some implementations, the processor-readable storage medium 210 may include the goal repository 180. In some implementations, the processor-readable storage medium 210 may include computer-executable instructions for an emotion detection module. In some implementations, emotion detection module may be constructed to detect an emotion based on captured image data (e.g., image data captured by the perceptual system 123 and/or one of the imaging devices). In some implementations, the emotion detection module may be constructed to detect an emotion based on captured audio data (e.g., audio data captured by the perceptual system 123 and/or one of the microphones). In some implementations, the emotion detection module may be constructed to detect an emotion based on captured image data and captured audio data. In some implementations, emotions detectable by the emotion detection module include anger, contempt, disgust, fear, happiness, neutral, sadness, and surprise. In some implementations, emotions detectable by the emotion detection module include happy, sad, angry, confused, disgusted, surprised, calm, unknown. In some implementations, the emotion detection module is constructed to classify detected emotions as either positive, negative, or neutral. In some implementations, the robot computing device 105 may utilize the emotion detection module to obtain, calculate or generate a determined emotion classification (e.g., positive, neutral, negative) after performance of an action by the machine, and store the determined emotion classification in association with the performed action (e.g., in the storage medium 210).

In some implementations, the testing system may a hardware device or computing device separate from the robot computing device, and the testing system includes at least one processor, a memory, a ROM, a network device, and a storage medium (constructed in accordance with a system architecture similar to a system architecture described herein for the machine 120), wherein the storage medium stores computer-executable instructions for controlling the testing system 150 to perform processes performed by the testing system, as described herein.

In some implementations, the conversation authoring system may be a hardware device separate from the robot computing device 105, and the conversation authoring system may include at least one processor, a memory, a ROM, a network device, and a storage medium (constructed in accordance with a system architecture similar to a system architecture described herein for the robot computing device 105), wherein the storage medium stores computer-executable instructions for controlling the conversation authoring system to perform processes performed by the conversation authoring system.

In some implementations, the evaluation module generator may be a hardware device separate from the robot computing device 105, and the evaluation module generator may include at least one processor, a memory, a ROM, a network device, and a storage medium (constructed in accordance with a system architecture similar to a system architecture described herein for the robot computing device), wherein the storage medium stores computer-executable instructions for controlling the evaluation module generator to perform processes performed by the evaluation module generator, as described herein.

In some implementations, the goal authoring system may be a hardware device separate from the robot computing device, and the goal authoring system may include at least one processor, a memory, a ROM, a network device, and a storage medium (constructed in accordance with a system architecture similar to a system architecture described instructions for controlling the goal authoring system to perform processes performed by the goal authoring system. In some implementations, the storage medium of the goal authoring system may include data, settings and/or parameters of the goal definition user interface described herein. In some implementations, the storage medium of the goal authoring system may include computer-executable instructions of the goal definition user interface described herein (e.g., the user interface). In some implementations, the storage medium of the goal authoring system may include data of the goal definition information described herein (e.g., the goal definition information). In some implementations, the storage medium of the goal authoring system may include computer-executable instructions to control the goal authoring system to generate the goal definition information described herein (e.g., the goal definition information).

Figure 3A:
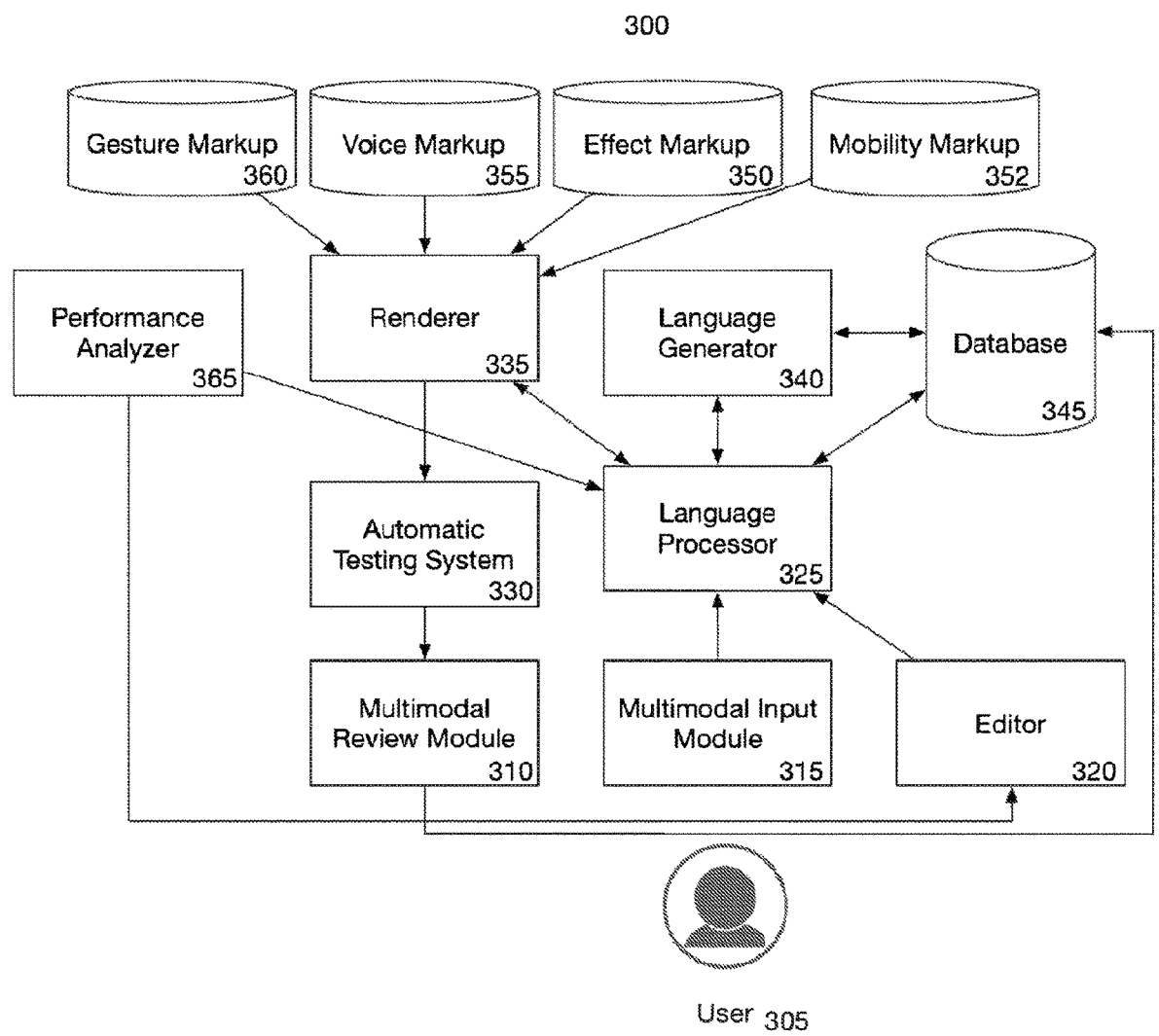
FIG. 3A illustrates a system configured for authoring and modifying presentation conversation files, in accordance with one or more implementations.

FIG. 3A illustrates a multimodal authoring system according to some implementations. In some cases, modules may communicate with each other although there are not arrows or lines between the different modules. Not all communication paths are shown in FIG. 3A in order to not complicate the drawing. In some implementations, the multimodal authoring system 300 may include a user, a multimodal review module 310, a multimodal input module 315, an editor module 320, a language processor module 325, an automatic testing system 330, a renderer module 335, a language generator module 340, a database or a database module 345, a performance analyzer module 365, an effect markup module 350, a voice markup module 355 and/or a gesture markup module 360. In some implementations, all of these modules may be utilized and in some implementations, only a few of the modules may be utilized. In some implementations, the renderer module 335 receives multimodal inputs from the markup modules (360, 355 and 350) and converts them to a format that the automatic testing system 330 may utilize and/or test. For example, the renderer module 335 may receive Perception Markup Language (PML) or Behavior Markup Language (BML) input files that describe perceptual input (human performance, facial expressions, voice, language, etc.; PML) and files that describe the behavioral output of an agent (e.g., gestures, facial expressions, etc.). In some implementations, the renderer module 335 is testing how the artificial companion side of a conversation interactions will go. In some implementations, the renderer module 335 is not editing or creating content; it is just converting into a format the automatic testing system 330 may utilize and/or test.

In some implementations, the multimodal authoring system 300 includes three markup modules (e.g., an effect markup module 350, a voice markup module 355 and/or a gesture markup module 360). In some implementations, the multimodal authoring system author may utilize the gesture markup module 360 to create or generate gesture files and/or logs. In some implementations, these gesture files or logs may be instructions, parameters and/or data that is transferred to the renderer module 335 in order for the renderer module to create testing gesture files or logs that are included in presentation conversation files or logs that are communicated to the automatic testing system 330 to test or implement. In some implementations, these may be instructions, commands or files that cause a testing system to move an arm and wave a hand, to extend an arm for a handshake or to cause an arm to point to a specific location. In some implementations, these may be instructions to cause the testing system (or test robot) to move with a certain pattern and/or to a certain location.

In some implementations, the voice markup module 355 may generate voice files or voice logs. In some implementations, this may include a human author creating voice recordings via one or more microphones and receiving this as input to the voice markup module 355. In some implementations, the human author may create voice markup files or logs via inputting text to explain what should be said or what sound to reproduce, an emotional parameter for the sound and/or other characteristics or parameters for the voice. In some implementations, these voice files or logs may be instructions, parameters and/or data that are transferred to the renderer module 335 in order for the renderer module to create testing voice files or logs that are included in presentation conversation files or logs. The presentation conversation files or logs are communicated to the automatic testing system 330 to test or implement. In some implementations, these may be instructions, commands or files that cause an automatic testing system 330 to let out a gasp, speak an introductory phrase "Hello Sam" or to provide an answer to a question that was received.

In some implementations, the effect markup module 355 may generate effect files or effect logs. In some implementations, this may include a human author receiving visual graphic files and including these along with other commands, instructions or parameters in creating the effect files or effect logs. In some implementations, no outside graphic files may be utilized and the human author, utilizing the effect markup module 355 may create the effect files or effect logs and these would include parameters, commands or instructions on what facial expressions, for example, the automatic testing should display. In some implementations, the effect markup module 355 would communicate the effect files or logs to the renderer module 335 in order for the renderer module to create testing effect files or logs that are to be included in the presentation conversation files or logs. In some implementations, the presentation conversation files or logs that include the effect files or logs would be sent to the automatic testing system 330 to test or implement. In some implementations, these may be, for example, commands or instructions to cause the automatic testing system's eyes to display a look of surprise, to create a smile with its lips, or to close its eyes.

In some implementations, the mobility markup module 352 may generate mobility files or mobility logs. In some implementations, this may include a human author utilizing commands, instructions and/or parameters in creating the mobility files or logs. In some implementations, for example, these may be commands for the entire computing device or robot computing device to move to a new geographic location, dance or physically move in space. In some implementations, the mobility markup module 452 may communicate the mobility files or logs to the renderer module 335 in order for the renderer module to create mobility files or logs that are to be included in the presentation conversation files or logs. In some implementations, the presentation conversation files or logs that include the mobility files or logs would be sent to the automatic testing system 330 to test or implement In some implementations, the effect files or effect logs, the voice files or voice logs, the mobility files or logs, and/or the gesture files or gesture logs may also include timing information or parameters. In some implementations, this would allow the renderer to synch up the gesture files or logs, the mobility files or logs, the voice markup files or logs and the effect files or logs when combining them into the presentation conversation files or logs. In some implementations, for example, it would be important to synch up gesture logs (requesting a testing device or artificial companion to move its hand to shake the user's hand) at the same time it says hello (via instructions from voice files or logs) and has a smile on its face (via instructions from gesture files or logs).

In some implementations, the renderer module 335 may prepare presentation conversation files or logs for testing by the automatic testing system 330. In some implementations, the renderer module 335 may receive modified presentation conversation files or logs and/or edited presentation conversation files or logs from the language processor modules 325. In some implementations, the renderer module 335 may also give the review module and/or automatic testing system access to the rendered performances or presentations.

In some implementations, the automatic testing system 330 may emulate a digital companion and/or robot computing device in order to test whether or not the received presentation conversation files can be utilized in end user digital companions and/or robot computing devices. In some implementations, this may mean that the automatic testing system 330 is configured like the exact digital companion or robot computing device it is trying to represent or has some of the most important features of the exact digital companion or robot computing device it is trying to represent or emulate. In some implementations, the automatic testing system 330 may receive the presentation conversation files or logs, test the files or logs and then communicate results to the multimodal review module 310. In some implementations, the multimodal review module 310 may present the results of the testing of the presentation conversation files to the author in order for the author to receive feedback. In some implementations, the multimodal review module 310 may communicate the results to the database 345 along with the presentation conversation files in order to utilize them in the future to see what went right and what went wrong. In some implementations, for example, the multimodal review module 310 may indicate, for example, that the visual effect associated with the voice was not particularly effective or did not convey the desired information well. As another example, the multimodal review module 310 may also indicate the facial expression was only presented for a portion of a hand movement and needs to be lengthened or shortened, may indicate that the voice is garbled during this timeframe, or may indicate that this section of presentation conversation file does not work. As another example the review system may highlight an impossible performance that cannot be performed by the robot computing device due to physical constraints like limited degrees of freedom. As another example the review system may indicate that the voice markup causes the robot to mumble or garble certain aspects of the synthesized speech and voice.

Once the human author receives feedback about what needs to be changed, the human author can utilize the editor module to edit the gesture files or logs, the voice files or logs, and/or the effect files or logs. In some embodiments, for example with the garbled voice file found by the multimodal review module 310, the editor module may allow editing of the gesture files or logs, the mobility files or logs, the voice files or logs, and/or the effect files or logs. In some implementations, the editor module 320 can change a voice, a graphical user interface, change text, change facial expressions in the different logs or files. In some implementations, the editor module 320 may generate edited gesture files or logs, edited voice files or logs, and/or edited effect files or logs.

In some implementations, the multimodal input module 315 may allow a creator to provide input and/or examples to the language processor module 325. In some implementations, for example, a creator may want a wave to be a left-to-right wave. Thus, the creator may capture a left-to-right wave and input this to the language processor module 325 so that the language processor module 325 makes sure the wave meets what the creator would like or requires. Similarly, the creator could record via the one or more microphones of the multimodal input module 315 what he believes is a soothing or calming voice and the language processor module 325 may utilize this to ensure that soothing or calming voices have the characteristics the creator would like.

In some embodiments, the editor module 320 may include autocomplete functionality. In some implementations, when a creator is editing voice files or logs, gesture files or logs and/or effect files or logs (which may be mobility commands), the editor module 320 might autocomplete sentences or phrases based on a context of the sentence, past usage, grammatical suggestions and/or vocabulary suggestions and/or phrase hints suggestions to make the editing process more efficient. Similarly, if the editor module 320, for example, knows that when the digital companion or robot computing device smiles, the eyes have to close a little, the editor module 320 may generate the additional commands and/or instructions based on the autocompletion functionality. In some implementations, the editor module 320 may also generate alternative suggestions for the voice files or logs, gesture files or logs, effect (or mobility) files or logs. In some implementations, the editor module 320 may provide these suggestions based on past conversations or other characteristics.

In some implementations, the editor module 320 may communicate edited voice files or logs, edited gesture files or logs, and/or edited effect (or mobility) files or logs to the language processor 325. In some implementations, the language processor reviews the received edited voice files or logs, edited gesture files or logs, and/or edited effect (or mobility) files or logs and verifies that these edited files are correct and/or follow the guidelines for the artificial companion and/or robot computing device. For example, in some implementations, the language processor module 325 may communicate with the database 345 to determine preferences, characteristics or requirements for the artificial companion and/or robot computing device may have and make sure the edited voice, effect and/or gesture files or logs meet follow the characteristics or requirements and are in line with the preferences of the artificial companion. For example, the language processor module 325 may determine that a robot computing device may not move as instructed by the mobility or effect files or logs and may change the modified mobility or effect files to bring the robot device in conformance. Similarly, the language processor module 325 may retrieve from the database 345 that the digital companion has a feisty personality and may change the gesture files or logs to reflect more feisty facial expressions. In some implementations, the language generator module 340 may learn from past conversation interactions and may provide input or suggestions to the language processor module 325 as to what should be included in the modified presentations conversation files that are created by the language processor module. In some implementations, the language generator module 340 may receive input from a performance analyzer module 365 that is analyzing success or failure of presentation conversation files that have been implemented in end-user digital companions and/or robot computing devices. In some implementations, the language generator module 340 may suggest changes to the edited voice files or logs, edited gesture files or logs and edited effect (or mobility files or logs) based on characteristics of the digital companion and/or the robot computing device. In some implementations, the characteristics may include, but are not limited to a companion's personality characteristics, a companions' typical vocabulary, a target user group characteristics, a target user group's needs, goals or abilities, and/or characteristics of similar content. In some implementations, the characteristics of similar content may include sentiment of the similar content, affect of the similar content and/or context of the similar content. In some implementations, the language processor module 325 may receive this input from the language generator module 340 and may generate modified voice files or logs, modified gesture files or logs and/or modified mobility files or logs. In some implementations, the language processor module 325 may communicate the modified voice files or logs, the modified gesture files or logs and/or the modified mobility or effect files or logs to the renderer, which in turn will generate new presentation conversation files or logs based on the modified files or logs. In some implementations, the new presentation conversation files or logs may then be tested by the automatic testing system 330.

In some implementations, the language generator module 340 and/or the language processor module 325 may suggest a number of different branches that a conversation interaction with a digital companion may take. Thus, in some implementations, the language generator module 340 and/or the language processor module 325 may communicate these different branches to the renderer 335 and the renderer module 335 may generate presentation conversation files or logs that include multiple potential branches for the conversation interaction. In these implementations, the renderer module 335 may communicate the generated presentation conversation files or logs to the automatic testing system 330 so that the generated presentation conversation files or logs with multiple branches may be tested. In some implementations, the multimodal review module 310 may then generate performance statistics for the multiple branches so that the creator system or human creator may see the performance of the multiple branches.

In some implementations, the performance analyzer module 365 allows the multimodal authoring system to modify the presentation conversation files based on how the digital companion performs with respect to real time users. In some implementations, the performance analyzer module 365 may gather and/or receive data from multiple robot computing devices and/or digital companions that are interacting with real end users. In some implementations, the performance analyzer module 365 may then provide statistics on how well the presentation conversation logs or files performed under real world conditions to the language generator 340 and/or database 345 so that the multimodal authoring system may perform better or more efficiently in the future. In some implementations, this allows on-the-fly modification of voice files or logs, gesture files or logs, and/or effect files or logs or very quick modifications of voice files or logs, gesture files or logs and/or effect files or logs based on very recent actual use by end-users. This is a significant advantage the multimodal authoring system described herein has over prior authoring systems.

Figure 3B:
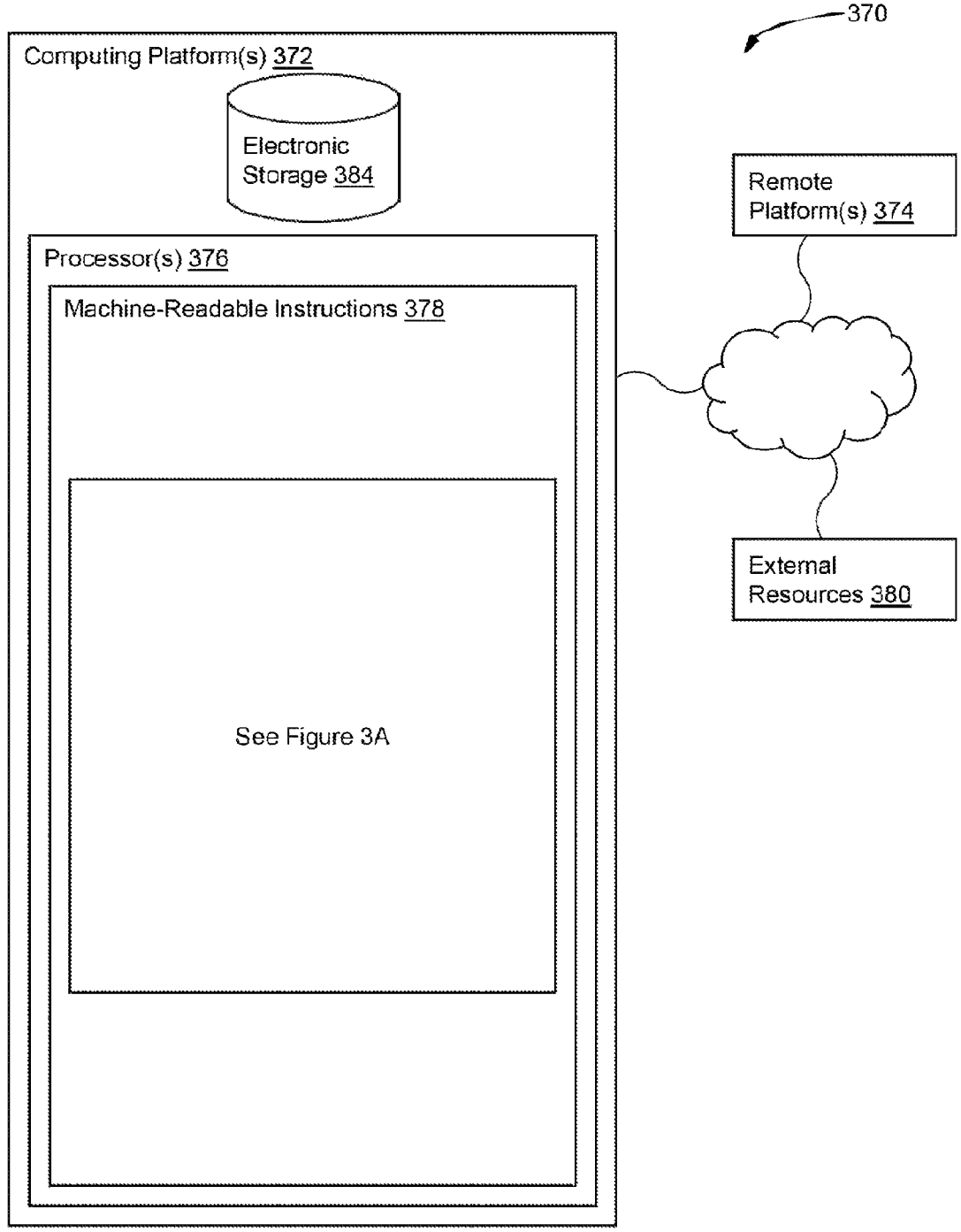
FIG. 3B illustrates a system configured for authoring and modifying presentation conversation files, in accordance with one or more implementations.

FIG. 3B illustrates a system 370 configured for authoring and modifying presentation conversation files, in accordance with one or more implementations. In some implementations, system 370 may include one or more computing platforms 372. Computing platform(s) 372 may be configured to communicate with one or more remote platforms 374 according to a client/server architecture, a peer-to-peer architecture, and/or other architectures. Remote platform(s) 374 may be configured to communicate with other remote platforms via computing platform(s) 372 and/or according to a client/server architecture, a peer-to-peer architecture, and/or other architectures. Users may access system 300 via remote platform(s) 304. One or more components described in connection with system 300 may be the same as or similar to one or more components described in connection with FIGS. 1A, 1B, and 2. For example, in some implementations, computing platform(s) 372 and/or remote platform(s) 374 may be the same as or similar to one or more of the robot computing device 105, the one or more electronic devices 110, the cloud server computing device 115, the parent computing device 125, and/or other components.

Computing platform(s) 372 may be configured by computer-readable instructions 376. Computer-readable instructions 376 may include one or more instruction modules. The instruction modules may include computer program modules. The instruction modules may include one or more of gesture markup module 360, voice markup module 355, effect markup module 350, renderer module 335, language generator module 340, database 345, language processor module 325, automatic testing system 330, multimodal review module 310, multimodal input module 315, and/or editor module 320, and/or other instruction modules.

In some implementations, computing platform(s) 372, remote platform(s) 374, and/or external resources 332 may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which computing platform(s) 302, remote platform(s) 304, and/or external resources 332 may be operatively linked via some other communication media.

A given remote platform 374 may include one or more processors configured to execute computer program modules. The computer program modules may be configured to enable an expert or user associated with the given remote platform 374 to interface with system 370 and/or external resources 380, and/or provide other functionality attributed herein to remote platform(s) 374. By way of non-limiting example, a given remote platform 374 and/or a given computing platform 372 may include one or more of a server, a desktop computer, a laptop computer, a handheld computer, a tablet computing platform, a NetBook, a Smartphone, a gaming console, and/or other computing platforms.

External resources 380 may include sources of information outside of system 370, external entities participating with system 370, and/or other resources. In some implementations, some or all of the functionality attributed herein to external resources 380 may be provided by resources included in system 370.

Computing platform(s) 372 may include electronic storage 384, one or more processors 376, and/or other components. Computing platform(s) 372 may include communication lines, or ports to enable the exchange of information with a network and/or other computing platforms. Illustration of computing platform(s) 372 in FIG. 3B is not intended to be limiting. Computing platform(s) 372 may include a plurality of hardware, software, and/or firmware components operating together to provide the functionality attributed herein to computing platform(s) 372. For example, computing platform(s) 372 may be implemented by a cloud of computing platforms operating together as computing platform(s) 372.

Electronic storage 384 may comprise non-transitory storage media that electronically stores information. The electronic storage media of electronic storage 384 may include one or both of system storage that is provided integrally (i.e., substantially non-removable) with computing platform(s) 372 and/or removable storage that is removably connectable to computing platform(s) 372 via, for example, a port (e.g., a USB port, a firewire port, etc.) or a drive (e.g., a disk drive, etc.). Electronic storage 384 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 384 may include one or more virtual storage resources (e.g., cloud storage, a virtual private network, and/or other virtual storage resources). Electronic storage 384 may store software algorithms, information determined by processor(s) 376, information received from computing platform(s) 372, information received from remote platform(s) 374, and/or other information that enables computing platform(s) 372 to function as described herein.

Processor(s) 376 may be configured to provide information processing capabilities in computing platform(s) 372. As such, processor(s) 376 may include one or more of a digital processor, an analog processor, a digital circuit designed to process information, an analog circuit designed to process information, a state machine, and/or other mechanisms for electronically processing information. Although processor(s) 376 is shown in FIG. 3B as a single entity, this is for illustrative purposes only. In some implementations, processor(s) 376 may include a plurality of processing units. These processing units may be physically located within the same device, or processor(s) 376 may represent processing functionality of a plurality of devices operating in coordination. Processor(s) 376 may be configured to execute modules 310, 315, 320, 325, 330, 335, 340, 345, 350, 355 and 360, and/or other modules. Processor(s) 336 may be configured to execute modules 310, 315, 320, 325, 330, 335, 340, 345, 350, 355 and 360, and/or other modules by software; hardware; firmware; some combination of software, hardware, and/or firmware; and/or other mechanisms for configuring processing capabilities on processor(s) 376. As used herein, the term "module" may refer to any component or set of components that perform the functionality attributed to the module. This may include one or more physical processors during execution of processor readable instructions, the processor readable instructions, circuitry, hardware, storage media, or any other components.

It should be appreciated that although modules 310, 315, 320, 325, 330, 335, 340, 345, 350, 355 and 360 are illustrated in FIG. 3B as being implemented within a single processing unit, in implementations in which processor(s) 376 includes multiple processing units, one or more of modules 310, 315, 320, 325, 330, 335, 340, 345, 350, 355 and 360 may be implemented remotely from the other modules. The description of the functionality provided by the different modules 310, 315, 320, 325, 330, 335, 340, 345, 350, 355 and 360 described below is for illustrative purposes, and is not intended to be limiting, as any of modules 310, 315, 320, 325, 330, 335, 340, 345, 350, 355 and 360 may provide more or less functionality than is described. For example, one or more of modules 310, 315, 320, 325, 330, 335, 340, 345, 350, 355 and 360 may be eliminated, and some or all of its functionality may be provided by other ones of modules 310, 315, 320, 325, 330, 335, 340, 345, 350, 355 and 360. As another example, processor(s) 376 may be configured to execute one or more additional modules that may perform some or all of the functionality attributed below to one of modules 310, 315, 320, 325, 330, 335, 340, 345, 350, 355 and 360.

Figure 4A:
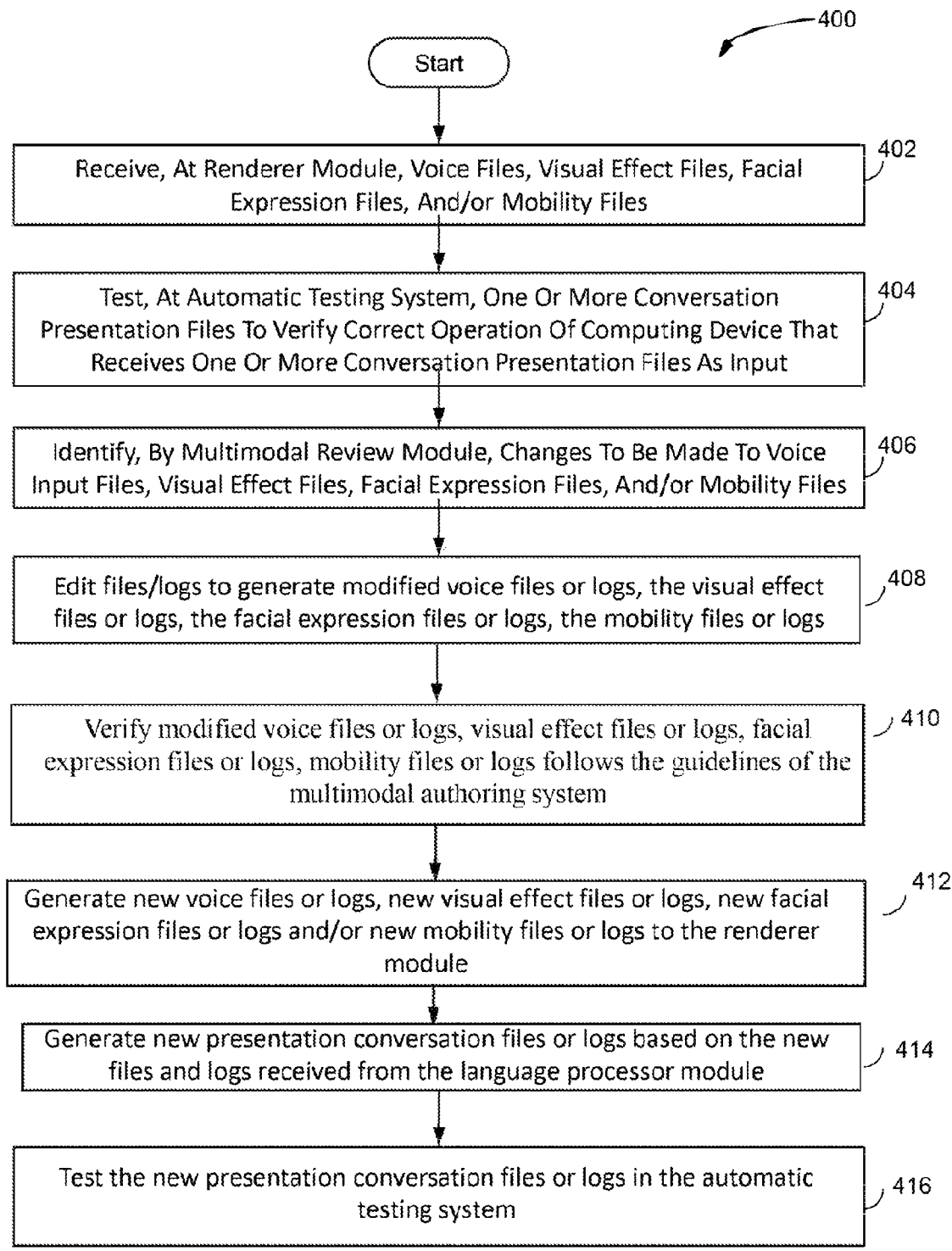
FIG. 4A illustrates a method for authoring and modifying presentation conversation files, in accordance with one or more implementations.
Figure 4B:
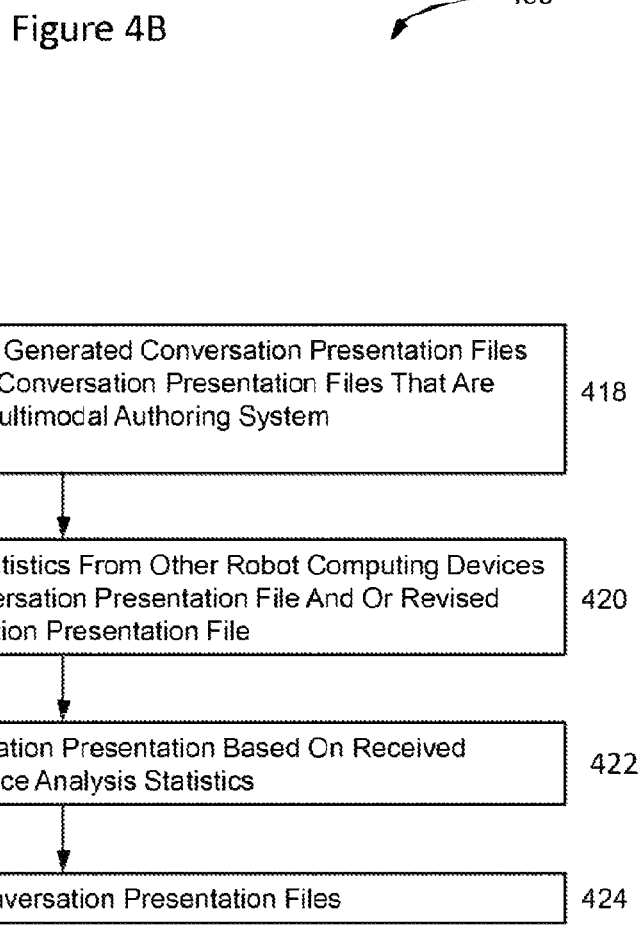
FIG. 4B illustrates a method for modifying presentation conversation files or logs, in accordance with one or more implementations.

FIG. 4A illustrates a method 400 for authoring and/or modifying presentation conversation files, in accordance with one or more implementations. FIG. 4B illustrates a method for modifying presentation conversation files or logs in accordance with one or more implementations. The operations of method 400 presented below are intended to be illustrative. In some implementations, method 400 may be accomplished with one or more additional operations not described, and/or without one or more of the operations discussed. Additionally, the order in which the operations of method 400 are illustrated in FIGS. 4A and 4B and described below is not intended to be limiting.

In some implementations, method 400 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 400 in response to instructions stored electronically on an electronic storage medium. The one or more processing devices may include one or more devices configured through hardware, firmware, and/or software to be specifically designed for execution of one or more of the operations of method 400.

In some implementations, an operation 402 may include receiving, at a renderer module 335, voice files or logs from voice markup module 355, visual effect files or logs from an effect markup module 350, facial expression files or logs from a gesture markup module 360, and/or mobility files or logs from a mobility markup module 352. In some implementations, the renderer module 335 also receives time stamp information to know when certain actions are to be performed. The timing parameters or information may be utilized by the renderer module 335 when generating the presentation conversation files or logs. Operation 402 may be performed by one or more hardware processors configured by computer-readable instructions including a module that is the same as or similar to renderer module 335, in accordance with one or more implementations.

In some implementations, an operation 404 may include testing, at an automatic testing system 330, the one or more presentation conversation files to verify correct operation of an artificial companion or robot computing device that the automatic testing system 330 is emulating and/or simulating. In some implementations, the automatic testing system 330 is being utilized to complete trial runs of presentation conversations to see if they will work and/or if any issues arise, such as the conversation often gets stuck in dead ends, is illogical, and/or plainly grammatically incorrect. Operation 404 may be performed by one or more hardware processors configured by computer-readable instructions including a module that is the same as or similar to automatic testing system 330, in accordance with one or more implementations.

In some implementations, an operation 406 may include identifying, by a multimodal review module 310, changes to be made to the voice input files, the visual effect files, the facial expression files and/or the mobility files. In some implementations, the multimodal review module 310 may receive input from the automatic testing system 330 and identify, for example, that the visual effect is not displaying correct, the robot cannot move to the location the mobility files are instructing it to, the gesture is not complete and is only formed back way, and/or the voice does not have the right inflection. Operation 406 may be performed by one or more hardware processors configured by computer-readable instructions including a module that is the same as or similar to multimodal review module 310, in accordance with one or more implementations.

In some implementations, an operation 408 may include communicating, to the editor module 320, the changes to be made to the voice files or logs, the visual effect files or logs, the facial expression files or logs and/or the mobility files or logs. In some implementations, the editor module 320 may allow the creator to edit the files and/or logs and to generate modified voice files or logs, the visual effect files or logs, the facial expression files or logs and/or the mobility files or logs. In some implementations, the editor module 320 may include autocomplete functionality. In some implementations, the editor module 320 may provide suggestions on how the different files or logs can be modified. Operation 408 may be performed by one or more hardware processors configured by computer-readable instructions including a module that is the same as or similar to editor module 320, in accordance with one or more implementations.

In some implementations, an operation 410 may further include communicating revised voice files or logs, revised visual effect files or logs, revised facial expression files or logs, revised gesture files or logs, and/or revised mobility files or logs to the language processor module 325 to verify these files follows the guidelines of the multimodal authoring system. In some implementations, the language processor module 325 may utilize the language generator module 340 and/or the database 345 to assist it in determining whether the revised files and logs meet the requirements and/or guidelines of the multimodal authoring system. In some implementations, the language processor module 325 may provide phrase hints and/or autocompletion of the files are log with the help of the language generator module 340 and/or the database. In some implementations, the language processor module 325 may provide suggestions for generation of the voice files, the visual effect files, the gesture files, the facial expression files and/or the mobility files based on a companion's or robot computing device characteristics. In some implementations, the companion characteristics include a companion's personality characteristics, the companion's typical vocabulary, target user characteristics for interacting with the user, and/or target user group's needs, goals and/or abilities. In some implementations, the new voice files, the new visual effect files, the new visual effect files, the new gesture files, and/or the new mobility files are based on the multimodal authoring system's analyzing similar content based on characteristics of the similar content. In some implementations, the characteristics of the similar content may include sentiment of the similar content, affect of the similar content and context of the similar content. Operation 410 may be performed by one or more hardware processors configured by computer-readable instructions including a module that is the same as or similar to language processor module 325, in accordance with one or more implementations. In some implementations, in operation 412, the language processor module 325 may generate new voice files or logs, new visual effect files or logs, new facial expression files or logs, new gestures files or logs, and/or new mobility files or logs to the renderer module 335. Operation 412 may be performed by one or more hardware processors configured by computer-readable instructions including a module that is the same as or similar to renderer module 335, in accordance with one or more implementations.

In some implementations, the operation 414 may generate new presentation conversation files or logs based on the new files and logs received from the language processor module 325. Operation 414 may be performed by one or more hardware processors configured by computer-readable instructions including a module that is the same as or similar renderer module 335, in accordance with one or more implementations.

In some implementations, the operation 416 may test the new presentation conversation files or logs in the automatic testing system 330. Operation 416 may be performed by one or more hardware processors configured by computer-readable instructions including a module that is the same as or similar to the automatic testing system 330, in accordance with one or more implementations.

Another unique aspect of the multimodal authoring system is that the language processor module may generate synonymous or similar voice files or logs, effect files or logs, facial expression files or logs, gesture files or logs, and/or mobility files or logs. In some implementations, the language processor module 325 generates these synonymous or similar files or logs and communicates these to the renderer module 335 where the synonymous or similar presentation conversation files or logs are then tested. In some implementations, operation 418 may include further including generate synonymous or similar voice files or logs, gesture files or logs, effect files or logs, facial expression files or logs and/or mobility files or logs. Operation 418 may be performed by one or more hardware processors configured by computer-readable instructions including a module that is the same as or similar to the language processor module 325, in accordance with one or more implementations.

In some implementations, an operation 420 may include receiving performance analysis statistics from other robot computing devices that have implemented the presentation conversation files and or the revised presentation conversation files that have been tested and/or approved by the multimodal authoring module. Operation 420 may be performed by one or more hardware processors configured by computer-readable instructions including a module that is the same as or similar to performance analysis statistics receiving module 365, in accordance with one or more implementations.

In some implementations, an operation 422 may generate modified voice files or logs, visual effect files or logs, gesture files or logs, facial expression file or logs, and/or mobility files or logs based on the performance analysis statistics and then generating modified presentation conversation files or logs based on the modified voice files or logs, visual effect files or logs, gesture files or logs, facial expressions or logs, and/or mobility files or logs. Operation 422 may be performed by one or more hardware processors configured by computer-readable instructions including a module that is the same as or similar to language processor module 325, editor module and/or renderer module, in accordance with one or more implementations.

In some implementations, an operation 424 may test the modified presentation conversation files or logs, as has been discussed above. Operation 420 may be performed by one or more hardware processors configured by computer-readable instructions including a module that is the same as or similar to the automatic testing system 330, in accordance with one or more implementations.

The system described herein has many unique improvements that allow editors and/or creators to edit, create, modify and/or test presentation conversation files or logs. The system described herein may be referred to as multimodal authoring and/or editing system for presentation conversation files. Other systems may allow creation of presentation conversation files but do not allow the testing and/or subsequent modification of the presentation conversation files or logs, nor do they allow the editing and/or modifying of the presentation conversation files. As an example, in some embodiments, a creator using a multimodal authoring system may wish to create presentation conversation files that are directed to space travel that are available to be utilized on a digital companion and/or robot computing device. In these embodiments, the creator may create gesture markup files, voice markup files, effect markup files and/or mobility markup files that are related to space travel. More specifically, the creator may utilize the gesture markup module 360 to generate gesture files causing the robot computing device to raise both arms to simulate the robot computing device being in flight and/or blasting off. In some embodiments, the multimodal authoring system 300 may include an imaging device to capture an individual making a gesture and may generate gesture markup files based on the captured gesture image. In addition, the editor may input gesture markup files into the gesture markup files. In some embodiments, the editor may speak instructions into the gesture module 360, which may automatically create gesture markup files based at least in part on the spoken instructions.

In some embodiments, the creator may utilize the voice markup module 355 to create scripts and voice markup files for discussing space travel to different planets with the users. In addition, the voice markup module 350 may generate sound files such as a rocket blasting off and/or alien sounds that can be utilized as additional sounds for the space-related voice conversation markup files. In some embodiments, the editor may capture sound effect files and may import the sound effect files into the effect markup module 350, which may then generate sound markup files. As an example, the author may have captured an actual rocket blasting off, may input this rocket blasting off sound file into the effect markup module 350, and the effect markup module 350 may generate space travel-related sound markup files. In some embodiments, the editor may input text files (along with emotion parameters or sentiment parameters or voice inflections) into the voice markup module 350, which then generate sound or voice markup files or logs based at least in part on this input. For example, the editor may input a sentence for the robot computing device to speak "I love space travel and can't wait until I can ride a rocket" with a positive inflection for the sentence and the voice markup module 355 may generate the voice markup files including the sentences along with the input reflection.

In some embodiments, the editor may utilize the effect markup module 350 to generate space-related effect markup files (e.g., rockets flying animations and/or planet picture files). In some embodiments, the editor may capture animations and/or pictures from external sources, may input the captured animations and/or pictures into the effect markup module 350, which may generate space flying and/or planet effect markup files. In some embodiments, the editor may speak or input text files that request an effect markup module 350 to create a rocket flying and/or a planet picture effect markup files.

In some embodiments, the editor may utilize the mobility markup module 352 to generate space-related mobility files (e.g., the robot computing device may shake or move simulating a rocket blasting off). In some embodiments, the editor may describe (utilizing a voice or text) that he wants the robot computing device to lean forward and/or run forward and the effect markup module 350 may automatically generate mobility markup files that would cause the robot computing device to lean forward and run forward. In some embodiments, the editor may utilize an imaging device to capture a movement the editor would like the robot computing device or digital companion to make or perform. The mobility markup module 352 may receive this captured image and create mobility markup files based at least in part on the captured image of the gesture. In these embodiments, the editor may communicate the gesture markup files, the voice or sound markup files, the effect markup files and/or the mobility markup files to the renderer module 335. In some embodiments, the renderer module 335 may combine the received markup files and render the markup files into a format that the automatic testing system 330 may be able to execute and/or test, which may be one or more presentation conversation files or logs.

In some embodiments, the automatic testing system 330 may test the received conversation presentation files or logs. In some embodiments, the automatic testing system 330 may test whether or not the voice files, the spoken words, the sound files, the effect files and/or the mobility files are operational with the desired robot computing devices and/or digital companions. In the space-related example above, the automatic testing system 330 may identify that the mobility presentation conversation files make the robot computing device look awkward and that the wrong planet image was shown (e.g., the selected image was not Mars which is what is allegedly being shown). In some embodiments, the automatic testing system 330 may report these results to the multimodal review module 310. In some embodiments, the multimodal review module 310 may also identify that the forward leading requested action is not possible on the type of robot computing device or digital companion that is being utilized. In some embodiments, the multimodal review module 310 may also report the results to the database module 345, where they may be stored for future use (e.g., in case there are future requests that try to have the robot computing device lean forward or move forward or that the suggested image is not of planet Mars, there will be indicators or parameters identifying that the action cannot be performed (e.g., move forward) or that the selected image is not an accurate representation of Mars). In some embodiments, the automatic testing system 330 may be able to simulate different robot computing devices and/or digital companions by initiating different device configuration files corresponding to the different robot computing devices and/or digital companions. For example, a single set of markup files may be tested on multiple devices having different configurations by having the automatic testing system 330 include different device configuration files.

In some embodiments, an editor module 320 may edit the tested conversation presentation files or logs to correct issues and/or failures in the tested conversation presentation files. In the space travel-related example discussed above, an editor may utilize the editor module 320 to delete the mobility command or instruction to lean forward (which results in edited mobility markup files) and/or may also change the image to a correct image of Mars (which results in edited effect markup files). The editor module 320 may communicate the edited markup files (e.g., edited gesture markup files, edited voice markup files, edited effect markup files, and/or edited mobility markup files) to the language processor module 325 (which verifies the edited markup files are in compliance with rules established for the robot computing device). The language processor module 325 may then send the edited markup files to the renderer module 335 for generation of the conversation presentation files.

The multimodal authoring system not only is able to test and/or correct conversation presentation files but also utilizes an editor module to make changes to gesture markup files, voice markup files, effect markup files and/or mobility markup files and a language processor module 325 to verify any changes made are logical and meet requirements and/or characteristics of the robot computing device and/or digital companion. As an example, young children interfacing with a robot computing device or digital companion may be interested in discussing horses and there may be a need to generate conversation presentation files that would be interesting to children who like horses. After testing of initial conversation presentation files, automatic testing system and/or the multimodal review module 310 may determine there are items that need to be changed in the tested conversation presentation files (and thus the underlying markup files). For example, the voice markup files may include the phrase "what species of horse would you like to learn about" and "it is fun to watch horses when they run so fast", the effect markup files may include a facial expression of a frown as well as a video of rocking horse, and also the gesture markup files may cause the robot computing device to make a triangle (rather than a horseshoe which is more representative of horse related gesture). In these examples, the editor module 320 may change the gesture markup files so that the gesture is now a "U" which is similar to the horseshoe shape, the voice markup files to include the phrases "what color or breed of horse would you like to learn about" and/or "it is fun to watch horses when they gallop" and/or the effect markup files to include a facial expression of a smile and/or a video of a horse playing in a field. In some embodiments, the editor module 320 may also include autocomplete functionality to automatically complete the markup files without editor intervention. In this horse example, the editor module 320 may automatically complete the sentence with the words "would you like to learn about" after the editor has input "what color or breed of horse" and also may autogenerate an effect markup file of a horse playing in a field based upon this prior voice markup input. In other words, the autocomplete functionality is for all of the markup files. As an example, the editor module may autocomplete effect markup files and/or sound markup files based on input voice markup files (and/or the autocompleted voice markup files) or can autocomplete other markup files based on input effect, mobility and/or gesture markup files.

In some embodiments, the editor module 320 may also add in a mobility markup file requesting that the robot computing device may spin in a circle, may also add a markup file asking if the user likes to watch horses run on the track at Hollywood Park, and may also add a voice markup file identifying that the robot computing device should speak in a high-pitched voice. In some embodiments, the editor module 320 may communicate the markup files described above to the language processor module 325 along with the prior edited markup files. In some embodiments, the language processor module 325 may verify that the voice, gesture, sound, effect and/or mobility markup files are in compliance with characteristics, preferences and/or requirements of the robot computing device. In some embodiments, the language processor module 325 may communicate with the database 345 to obtain the characteristics, preferences and/or requirements of the robot computing device and digital companion to utilize to verify the edited and new markup files are in compliance with the retrieved information. Utilizing the horse example described above, the language processor module 325 may retrieve from the database 345 that the robot computing device should never talk about anything related to gambling, that the robot computing device has a soothing personality and talks in a sweet voice and that robot computing device does not rotate. Based on the retrieved characteristics, preferences and/or requirements, the language processor module 325 may analyze the added markup files and communicate to the editor module that these markup file may not be used (e.g., no high-pitched voice, no talking about Hollywood Park and/or that the robot computing device device) and that the language processor module may not send these markup files to the renderer module 335.

In some embodiments, the language processor module 325 may also receive input from the language generator module 340 suggesting changes to the received edited markup files. In these embodiments, the language generator module 340 may receive input result parameters from the performance analyzer module 365 identifying whether prior presentation conversation files were successful or not in interfacing with the user or other users. In the horse example described above, for example, the performance analyzer module 365 may identify that the horseshoe gesture is not understood by past users and that petting gestures are much easier to understand and well-received. In response to this input, the language generator module 340 may take this information and may suggest that a petting gesture markup file be added and that a voice mark file stating "I like to pet horses." In some embodiments, the performance analyzer module 365 may receive past performance metrics related to similar subjects that the current conversation presentation files (and related voice, sound, effect, mobility or gesture markup files) from a number of robot computing devices that are in operation and/or communicating with the performance analyzer module 365. In some embodiments, the performance analyzer module 365 may receive performance metrics on-the-fly or in real time from the robot computing devices and thus have the most up-to-date information.

In some embodiments, the language generator module 340 may communicate with the database 345 to check characteristics of target users and/or the robot computing devices personality and/or vocabulary. Utilizing the horse example described above, the language generator module 350 may utilize the retrieved information from the database 345 to suggest that the word "breed" is not normally utilized by the robot computing device and then may suggest that the edited voice markup file should not have the word "breed" and should include the word "type." In this embodiment, the language generator module 340 may make these suggestions to the edited markup files and the language processor module 325 may communicate the edited gesture, sound, voice, effect and/or mobility files suggested by the language generator module 340 (that have been approved by the language processor module 325) to the renderer module 335. The use of the language generator module 340 to check the edited markup files for compliance with retrieved characteristics and/or parameters from the database and/or also to utilize past performance results to help in suggesting improved edited markup files to be communicated to the language processor module. Existing multimodal editing systems do not include that feature.

Another important advantage of the claimed subject matter is the ability to generate multiple alternative and/or additional markup files that are related to the edited markup files. In these embodiments, the language generator module 340 may suggest a number of different or alternative branches for an input markup file and/or the language processor module 325 may generate these additional markup files and communicate these along with the edited markup files to the renderer module 335 for conversion to conversation presentation files. In the horse example discussed above, the language generator module 340 may receive the voice markup file that states "what type or color of horse would you like to learn about" and may generate additional or alternative voice markup files asking "Would you like to learn about a brown horse?, Would you like to learn about a black horse, Would you like to learn about an Arabian horse, Would you like to learn about a mini horse, or Would you like to learn about a baby horse or pony?". Further, additional sound markup files and/or effect markup files related to the additional voice markup files may also be generated and provided to the language processor module 325 to send to the renderer 335 and then the automatic testing system 330 (e.g., effect markup files including images of the type of horse as well as sound markup files including sounds made by the type of horse.)

As detailed above, the computing devices and systems described and/or illustrated herein broadly represent any type or form of computing device or system capable of executing computer-readable instructions, such as those contained within the modules described herein. In their most basic configuration, these computing device(s) may each comprise at least one memory device and at least one physical processor.

The term "memory" or "memory device," as used herein, generally represents any type or form of volatile or non-volatile storage device or medium capable of storing data and/or computer-readable instructions. In one example, a memory device may store, load, and/or maintain one or more of the modules described herein. Examples of memory devices comprise, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

In addition, the term "processor" or "physical processor," as used herein, generally refers to any type or form of hardware-implemented processing unit capable of interpreting and/or executing computer-readable instructions. In one example, a physical processor may access and/or modify one or more modules stored in the above-described memory device. Examples of physical processors comprise, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

Although illustrated as separate elements, the method steps described and/or illustrated herein may represent portions of a single application. In addition, in some embodiments one or more of these steps may represent or correspond to one or more software applications or programs that, when executed by a computing device, may cause the computing device to perform one or more tasks, such as the method step.

In addition, one or more of the devices described herein may transform data, physical devices, and/or representations of physical devices from one form to another. For example, one or more of the devices recited herein may receive image data of a sample to be transformed, transform the image data, output a result of the transformation to determine a 3D process, use the result of the transformation to perform the 3D process, and store the result of the transformation to produce an output image of the sample. Additionally, or alternatively, one or more of the modules recited herein may transform a processor, volatile memory, non-volatile memory, and/or any other portion of a physical computing device from one form of computing device to another form of computing device by executing on the computing device, storing data on the computing device, and/or otherwise interacting with the computing device.

The term "computer-readable medium," as used herein, generally refers to any form of device, carrier, or medium capable of storing or carrying computer-readable instructions. Examples of computer-readable media comprise, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

A person of ordinary skill in the art will recognize that any process or method disclosed herein can be modified in many ways. The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed.

The various exemplary methods described and/or illustrated herein may also omit one or more of the steps described or illustrated herein or comprise additional steps in addition to those disclosed. Further, a step of any method as disclosed herein can be combined with any one or more steps of any other method as disclosed herein.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and shall have the same meaning as the word "comprising."

The processor as disclosed herein can be configured with instructions to perform any one or more steps of any method as disclosed herein.

As used herein, the term "or" is used inclusively to refer items in the alternative and in combination. As used herein, characters such as numerals refer to like elements.

Embodiments of the present disclosure have been shown and described as set forth herein and are provided by way of example only. One of ordinary skill in the art will recognize numerous adaptations, changes, variations and substitutions without departing from the scope of the present disclosure. Several alternatives and combinations of the embodiments disclosed herein may be utilized without departing from the scope of the present disclosure and the inventions disclosed herein. Therefore, the scope of the presently disclosed inventions shall be defined solely by the scope of the appended claims and the equivalents thereof.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A method of authoring and modifying presentation conversation files, comprising:
   accessing computer-readable instructions from one or more memory devices for execution by one or more processors of the computing device;
   executing the computer-readable instructions accessed from the one or more memory devices by the one or more processors of the computing device; and
   wherein executing the computer-readable instructions further comprising:
   receiving, at a renderer module of the computing device, voice files, visual effect files, facial expression files and/or mobility files;
   analyzing, by the language processor module of the computing device, whether the voice files, the visual effect files, the facial expression files and/or mobility files follow guidelines of a multimodal authoring system;

generating, by the renderer module, one or more presentation conversation files based at least in part on the received voice files, visual effect files, facial expression files and/or mobility files;

testing, at an automatic testing system, the one or more presentation conversation files to verify correct operation of a robot computing device that receives the one or more presentation conversation files as an input;

identifying, by a multimodal review module, changes to be made to the voice files, the visual effect files, the facial expression files and/or the mobility files generating revised voice files, revised visual effect files, revised facial expression files and/or revised mobility files based at least in part on the identified changes;

verifying, by the language processor module, that the revised voice files, revised visual effect files, revised facial expression files and/or revised mobility files are aligned with the robot computing device's personality and operational characteristics;

communicating the revised voice files, the revised visual effect files, the revised facial expression files and the revised mobility files to the robot computing device, wherein the revised voice files cause the robot computing device to make sounds and the revised mobility files cause parts of the robot computing device to move; and testing, at the automatic testing system, the one or more presentation conversation files on different device configuration files to simulate testing on different robot computing devices.

2. The method of claim 1, wherein executing the computer-readable instructions further comprising: communicating the revised voice files, the revised visual effect files, the revised facial expression files and/or the revised mobility files to the language processor module to verify these files follow the guidelines of the multimodal authoring system.

3. The method of claim 2, wherein executing the computer-readable instructions further comprising: wherein if the revised voice files, the revised visual effect files, the revised facial expression files and/or the revised mobility files follow the guidelines of the multimodal authoring system, communicating the revised voice files, revised visual effect files, revised facial expression files and/or revised mobility files to the renderer module to generate a new presentation conversation file.

4. The method of claim 1, wherein the voice files are generated utilizing one or more microphones and speech recognition software.

5. The method of claim 1, wherein the visual effect files are generated utilizing one or more imaging devices, one or more microphones and/or special effect software.

6. The method of claim 1, wherein the facial expression files are generated utilizing one or more imaging devices, one or more microphones and graphical animation software.

7. The method of claim 1, wherein the mobility files are generated utilizing one or more imaging devices, one or more microphones and mobility command generation software.

8. The method of claim 1, wherein the multimodal authoring system includes autocompletion software, the autocompletion software automatically authoring completing editing the voice files or logs, the visual effect files or logs, the facial expression files or logs and/or the mobility files or logs based on context, past usage, or grammatical suggestions.

9. The method of claim 1, wherein the multimodal authoring system provides suggestions for generation of the voice files, the visual effect files, the facial expression files and/or the mobility files based on a current context.

10. The method of claim 1, wherein the robot computing device's personality and operational characteristics include atypical vocabulary.

11. The method of claim 1, wherein the robot computing device's personality and operational characteristics include target user group characteristics.

12. The method of claim 1, wherein the robot computing device's personality and operational characteristics include target user group's needs, goals and/or abilities.

13. The method of claim 1, wherein the revised voice files, the revised visual effect files, the revised visual effect files and/or the revised mobility files are based on the multimodal authoring system's analyzing similar content based on characteristics of the similar content.

14. The method of claim 13, wherein the characteristics of the similar content comprise sentiment of the similar content, affect of the similar content and context of the similar content.

15. The method of claim 1, wherein executing the computer-readable instructions further comprising learning synonymous pathways to the generated presentation conversation files and generating synonymous additional presentation conversation files that are acceptable to the multimodal authoring system.

16. The method of claim 1, wherein executing the computer-readable instructions further comprising receiving performance analysis statistics from other robot computing devices that have implemented the presentation conversation file and or the revised presentation conversation file; generating a modified presentation conversation file based on the received performance analysis statistics; and further testing the modified presentation conversation file.

17. The method of claim 1, wherein the robot computing device comprises a computing device, a chatbot, a voice recognition computing device, or an artificial intelligence computing device.

18. The method of claim 1, wherein the revised facial expression files cause the robot computing device to change facial expressions on a display device of the robot computing device.

19. The method of claim 1, wherein the revised visual effect files cause to display visual effects or videos on a display device of the robot computing device.

* * * * *